United States Patent
Burchell et al.

(10) Patent No.: US 8,875,869 B1
(45) Date of Patent: Nov. 4, 2014

(54) ARTICLE PATTERN FORMING METHOD AND APPARATUS

(75) Inventors: Victor Howard Burchell, Howell, MI (US); James Harper Moffitt, York, PA (US)

(73) Assignee: SEETECH Systems, Inc., York, PA (US)

(*) Notice: Subject to any disclaimer, the term of this patent is extended or adjusted under 35 U.S.C. 154(b) by 150 days.

(21) Appl. No.: 13/602,929

(22) Filed: Sep. 4, 2012

Related U.S. Application Data

(63) Continuation-in-part of application No. 13/567,635, filed on Aug. 6, 2012.

(60) Provisional application No. 61/522,400, filed on Aug. 11, 2011.

(51) Int. Cl.
*B65G 57/06* (2006.01)

(52) U.S. Cl.
USPC .................. 198/418.5; 198/419.3; 198/418.7; 198/451

(58) Field of Classification Search
None
See application file for complete search history.

(56) References Cited

U.S. PATENT DOCUMENTS

| | | | | |
|---|---|---|---|---|
| 2,949,179 A * | 8/1960 | Busse | | 198/418.1 |
| 3,884,343 A * | 5/1975 | Stephens et al. | | 198/433 |
| 4,756,139 A * | 7/1988 | Le Bras | | 53/398 |
| 5,638,665 A * | 6/1997 | Muller | | 53/543 |
| 5,699,651 A * | 12/1997 | Miller et al. | | 53/448 |
| 6,152,681 A * | 11/2000 | Vincent et al. | | 414/789.9 |
| 6,206,173 B1 * | 3/2001 | Gallet | | 198/434 |
| 6,360,873 B1 * | 3/2002 | Bonnain et al. | | 198/419.3 |
| 6,669,005 B2 * | 12/2003 | Sandberg et al. | | 198/460.2 |
| 6,889,485 B2 * | 5/2005 | Davaillon | | 53/443 |
| 6,945,530 B2 * | 9/2005 | Cinotti et al. | | 271/240 |
| 8,092,144 B2 * | 1/2012 | Germain | | 414/792.6 |

* cited by examiner

*Primary Examiner* — Kavel Singh
(74) *Attorney, Agent, or Firm* — Hooker & Habib, P.C.

(57) ABSTRACT

A system for palletizing a multi-row pattern of articles includes a pattern-forming apparatus that includes a pair of fingers movable towards and away from each other to constrain rows of articles that impact one another to form a multi-row pattern of articles. The fingers can be either be fixed along the conveyor path or move with the containers along a portion of the conveyor path.

21 Claims, 24 Drawing Sheets

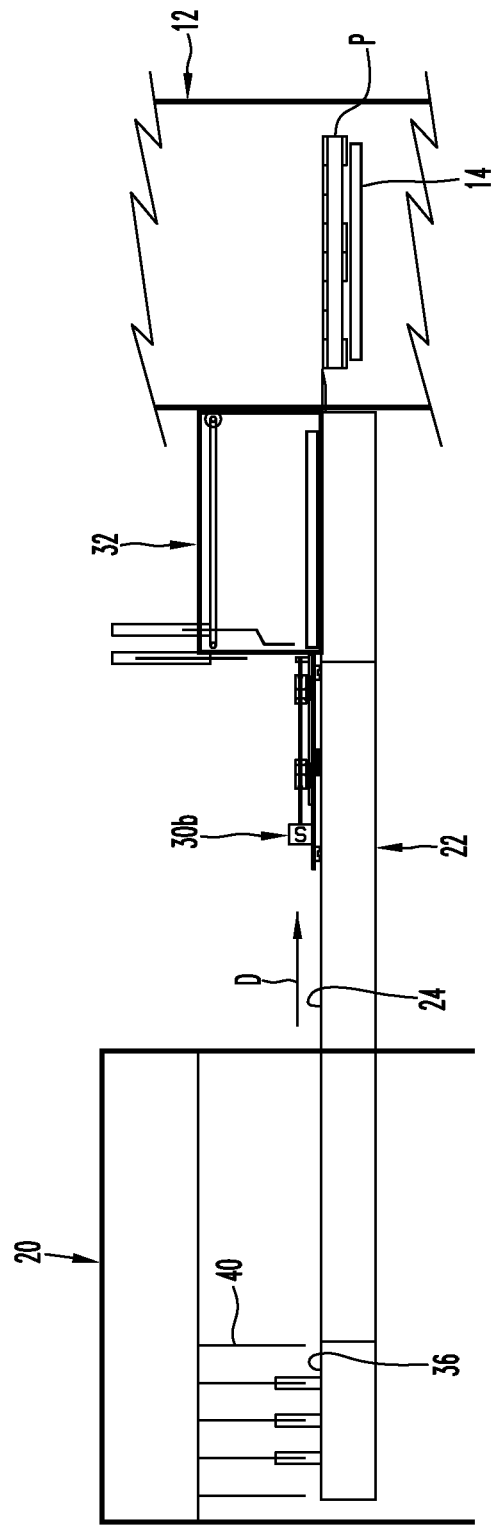

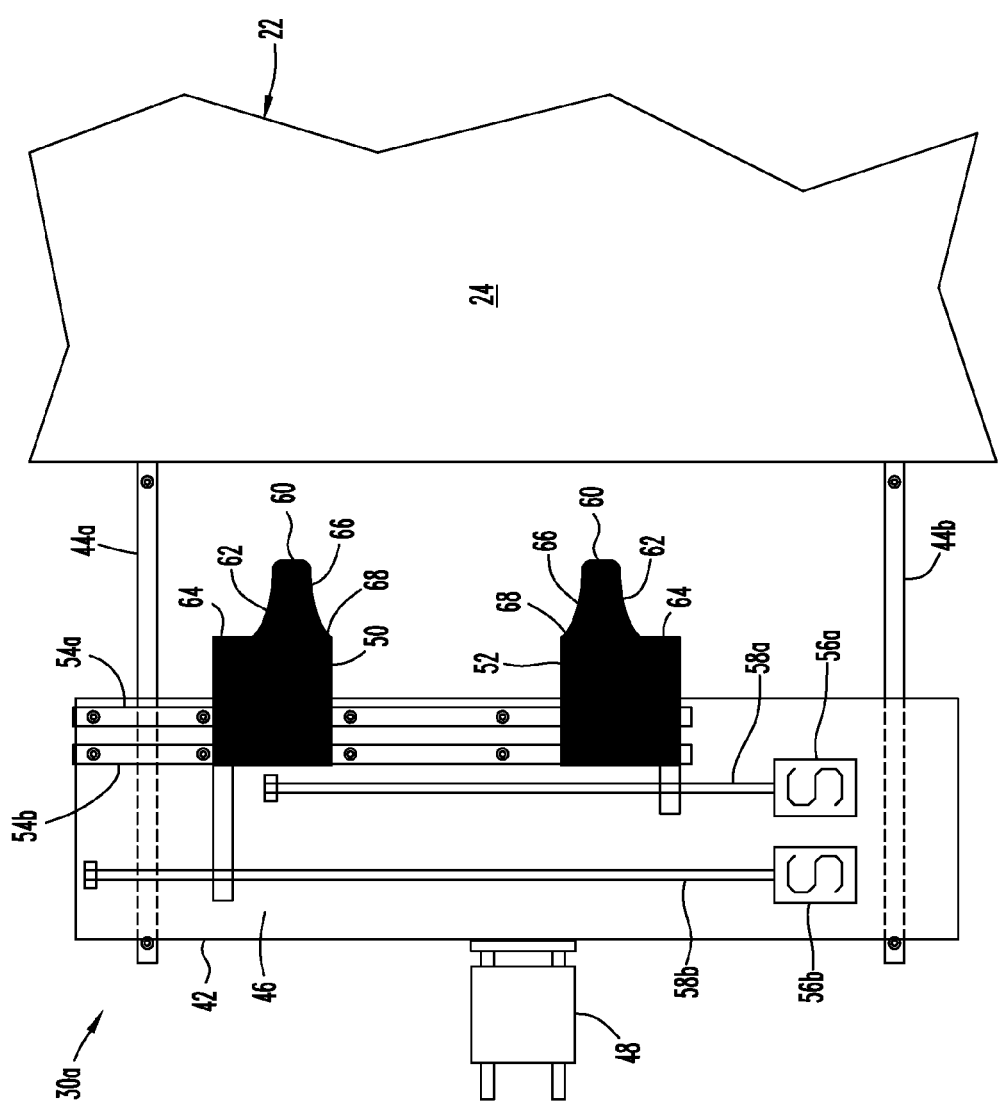

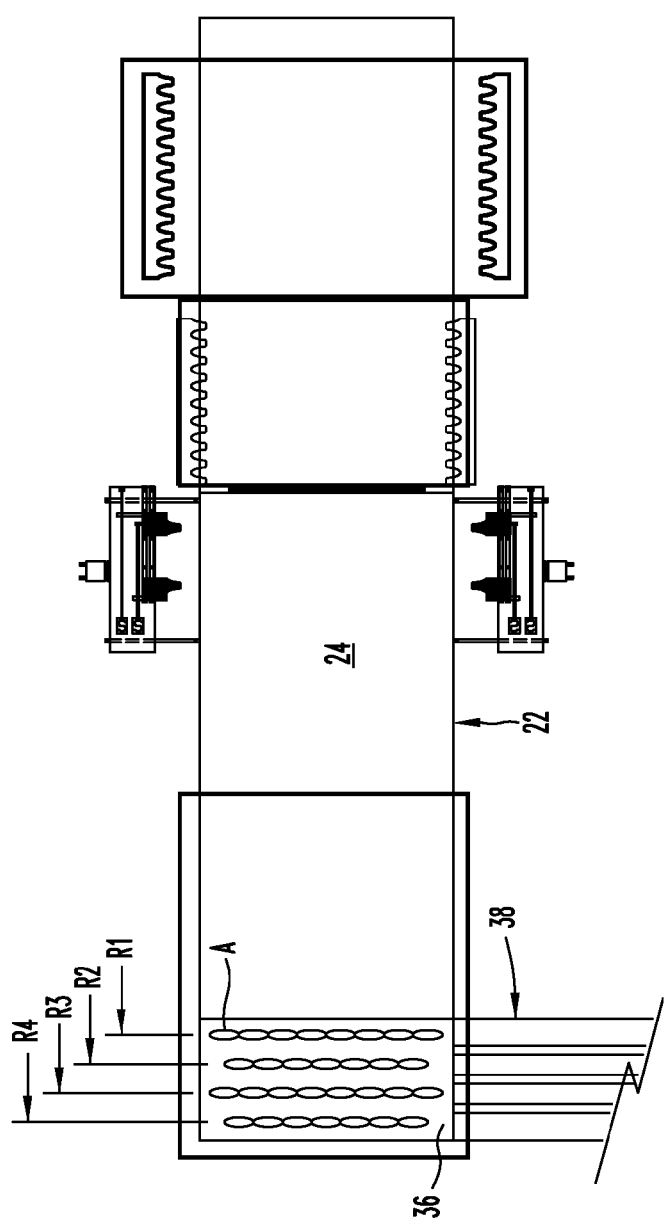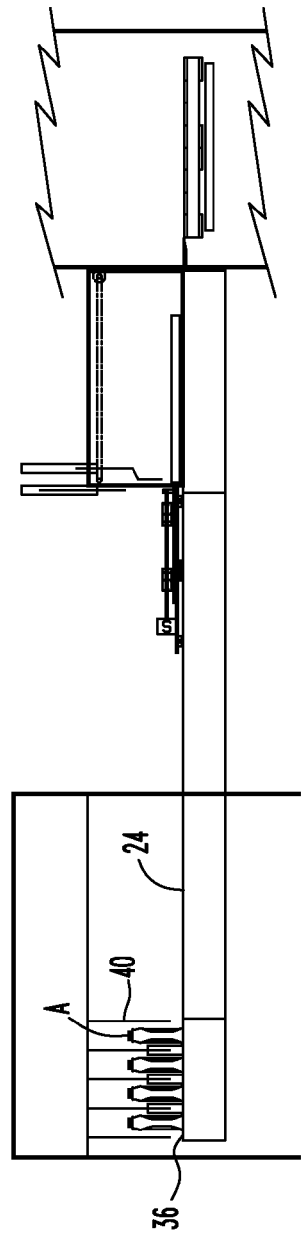

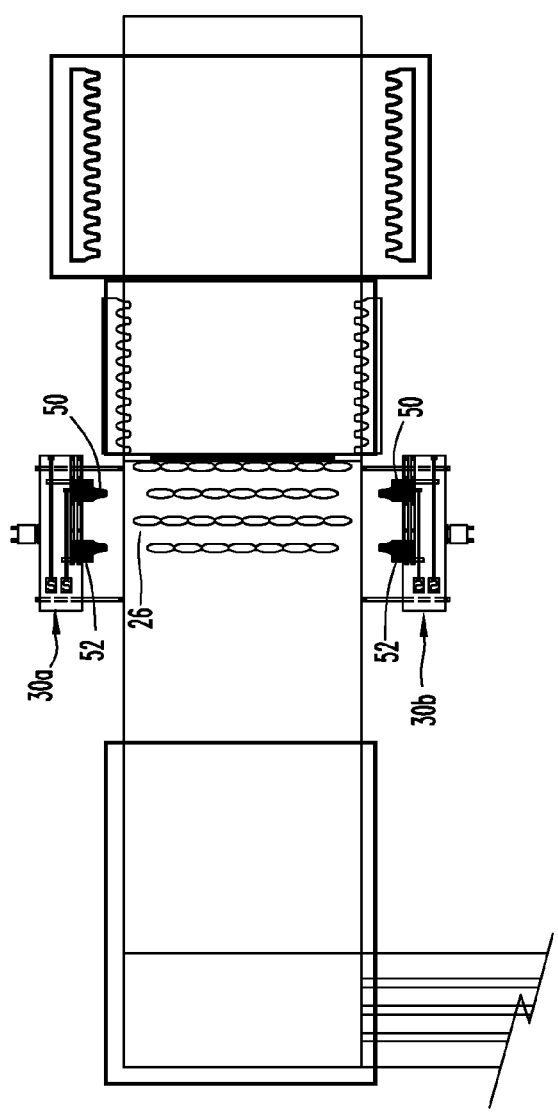
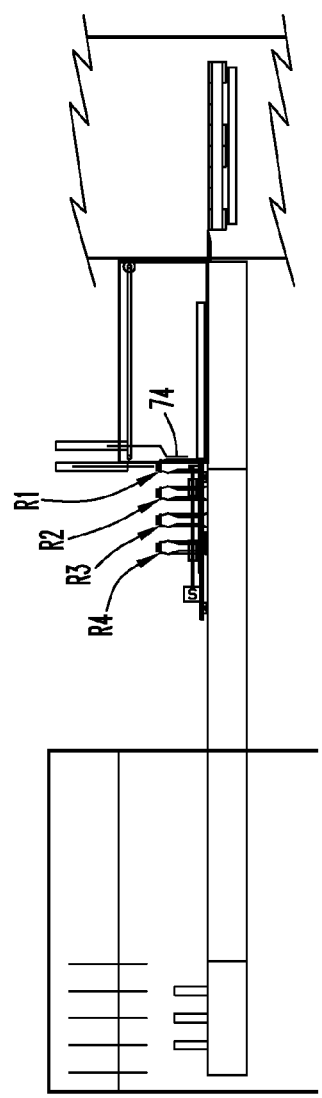

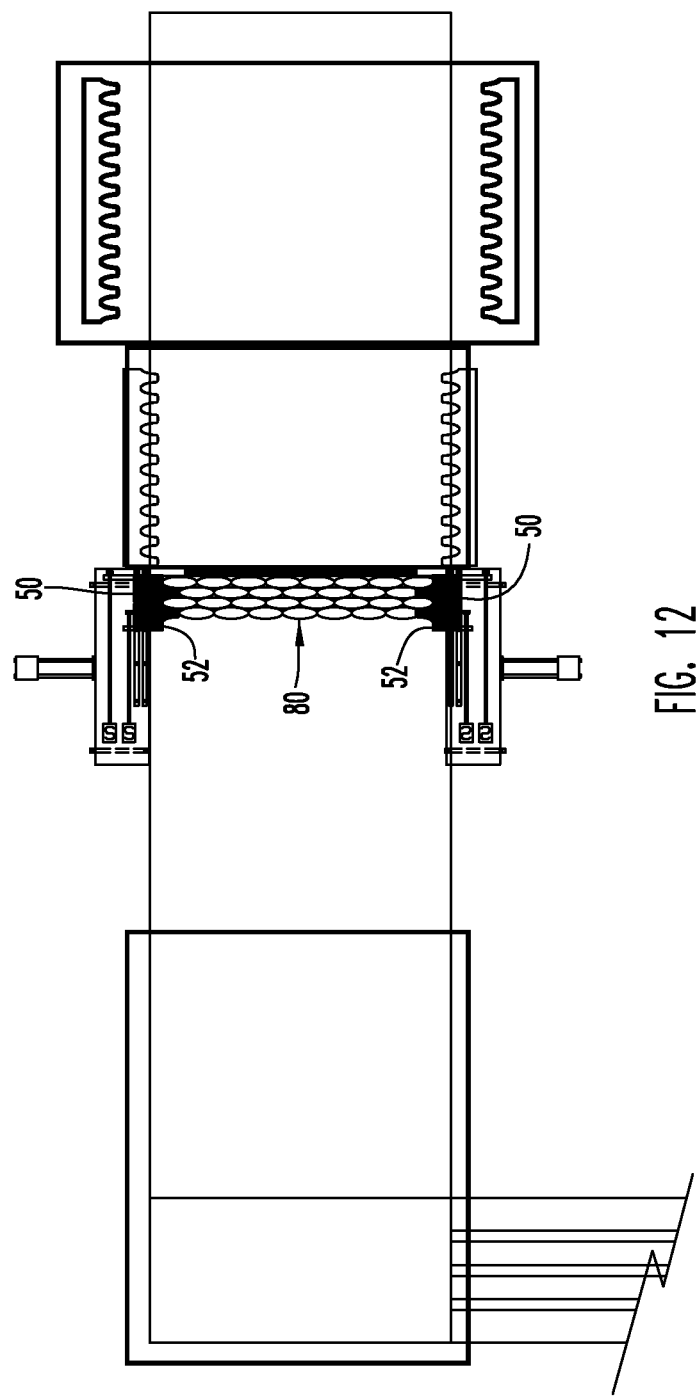

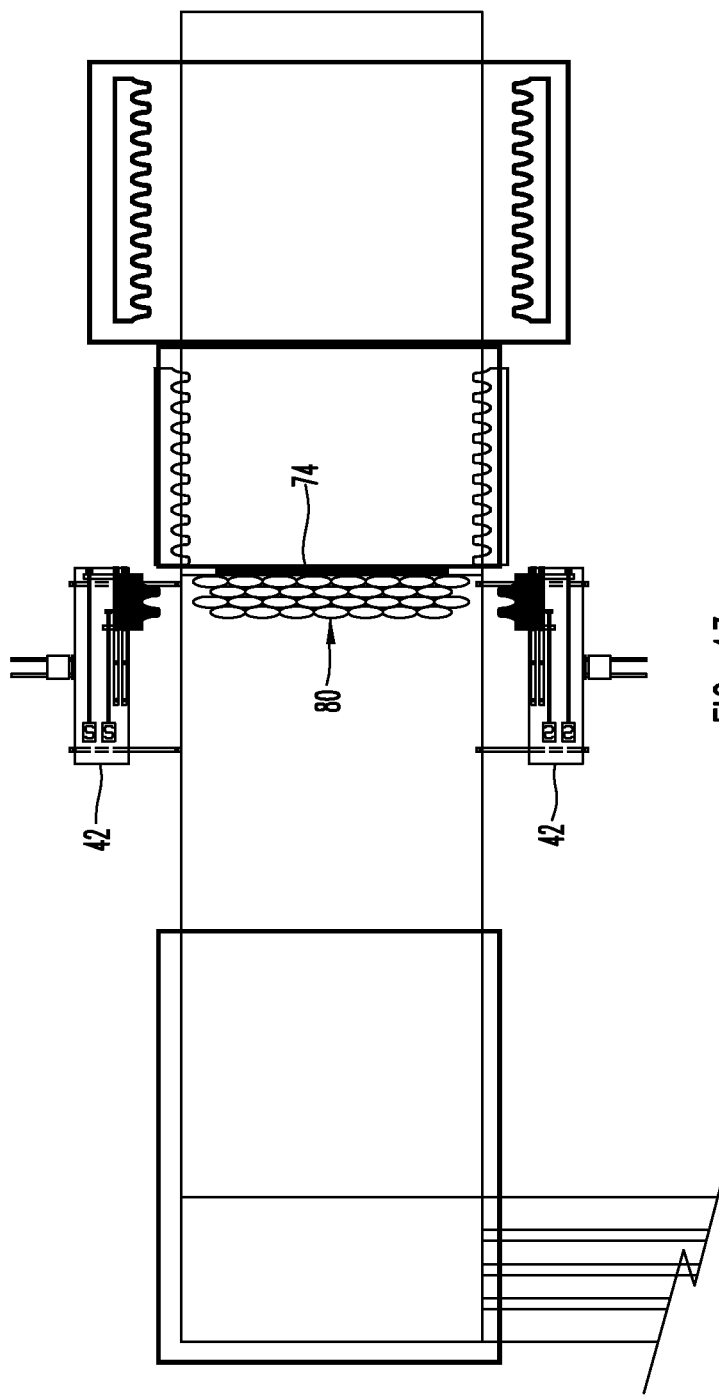

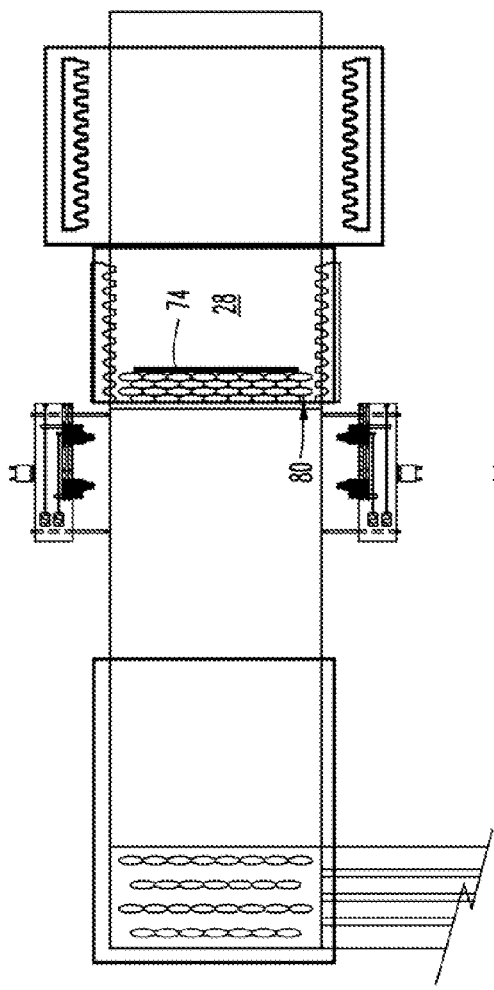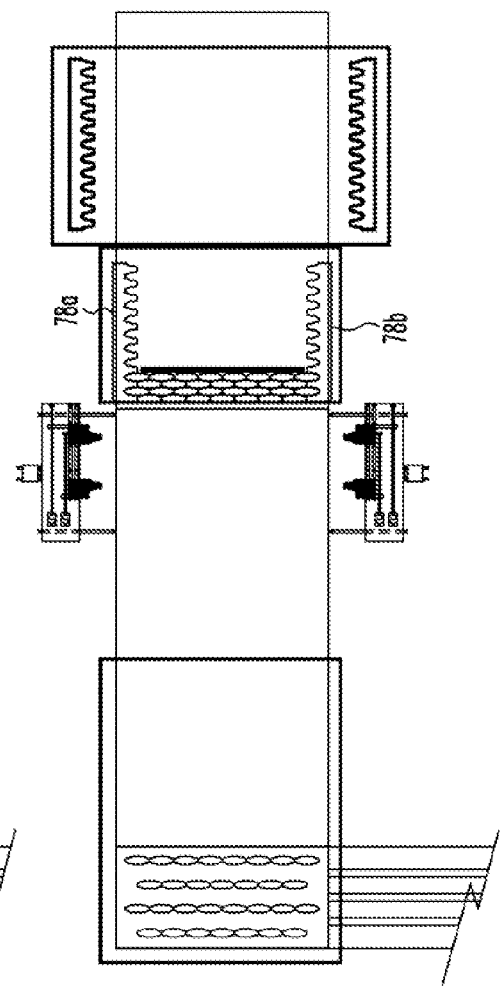

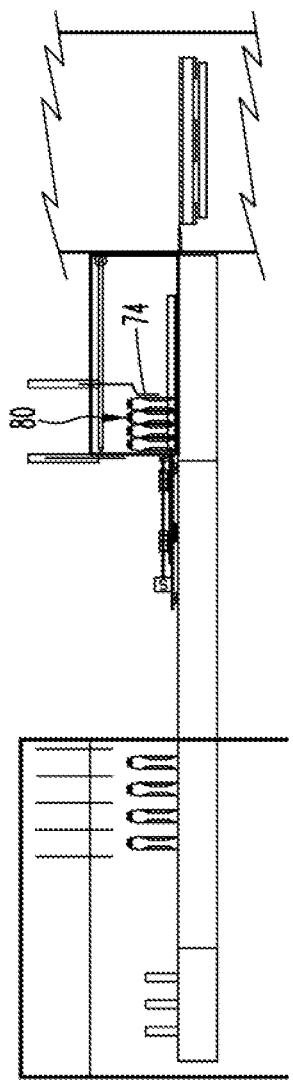
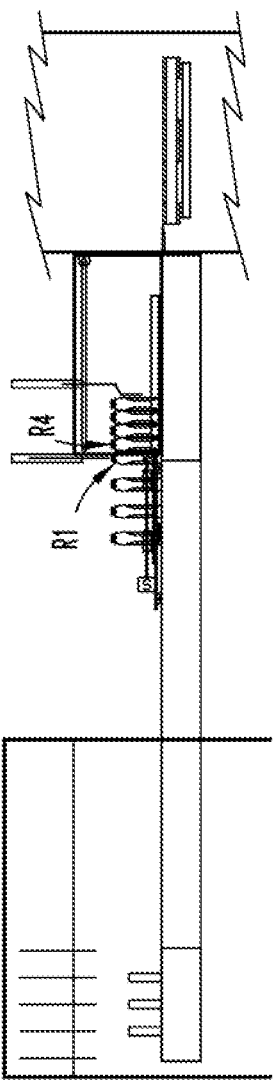

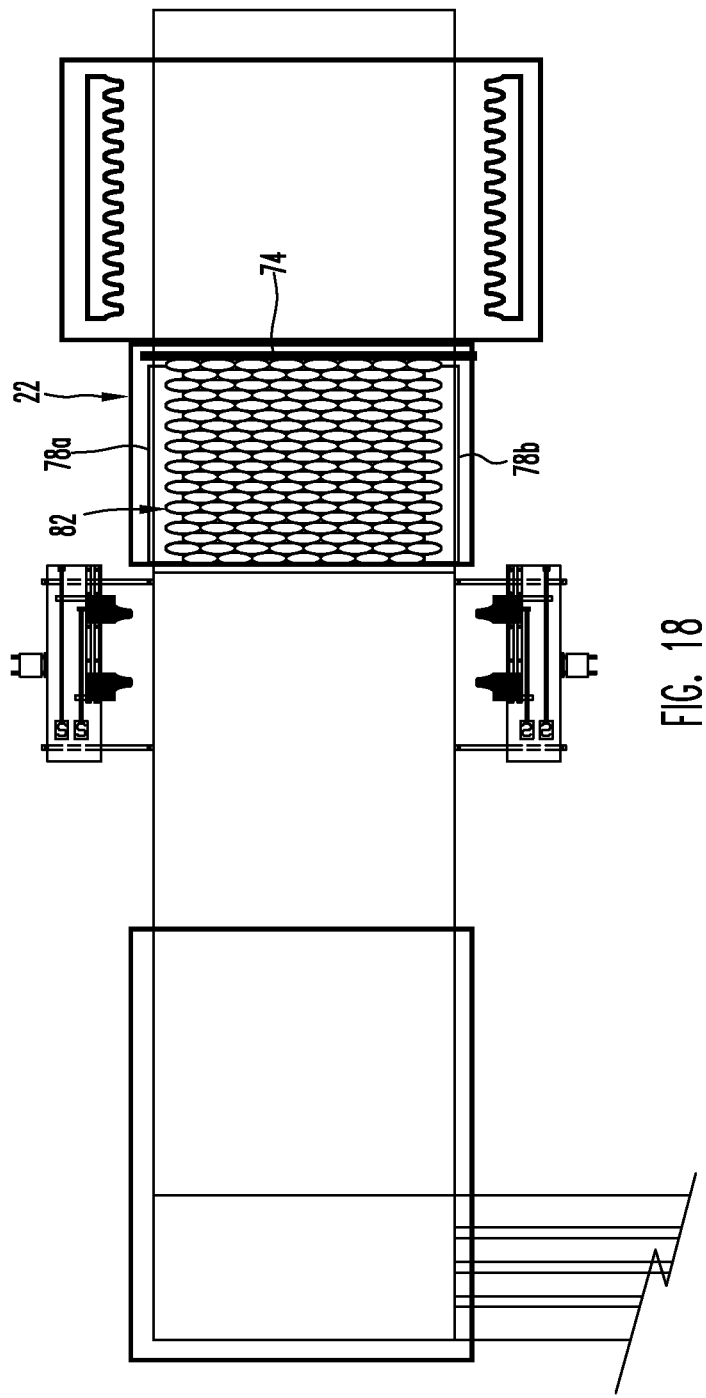

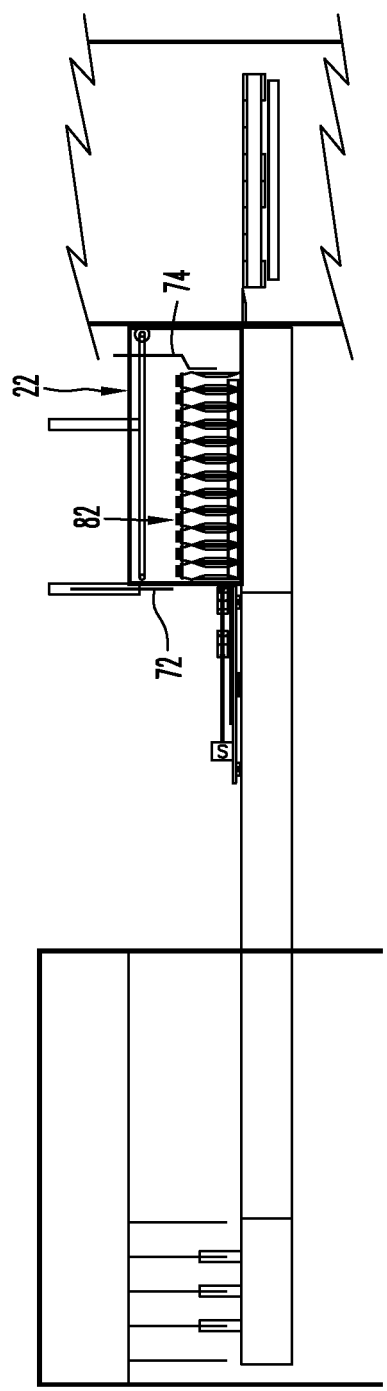
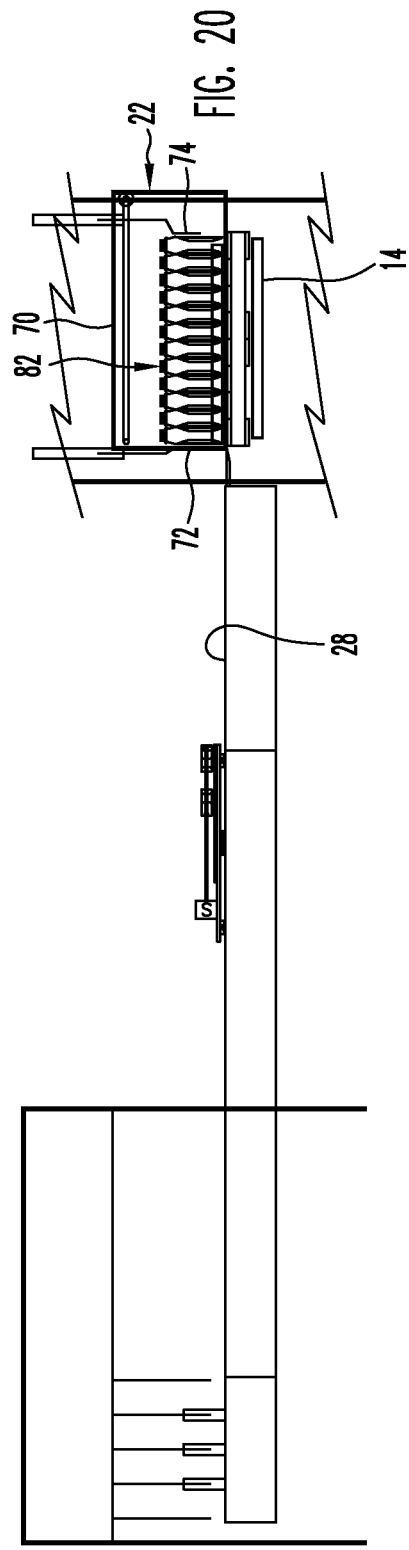

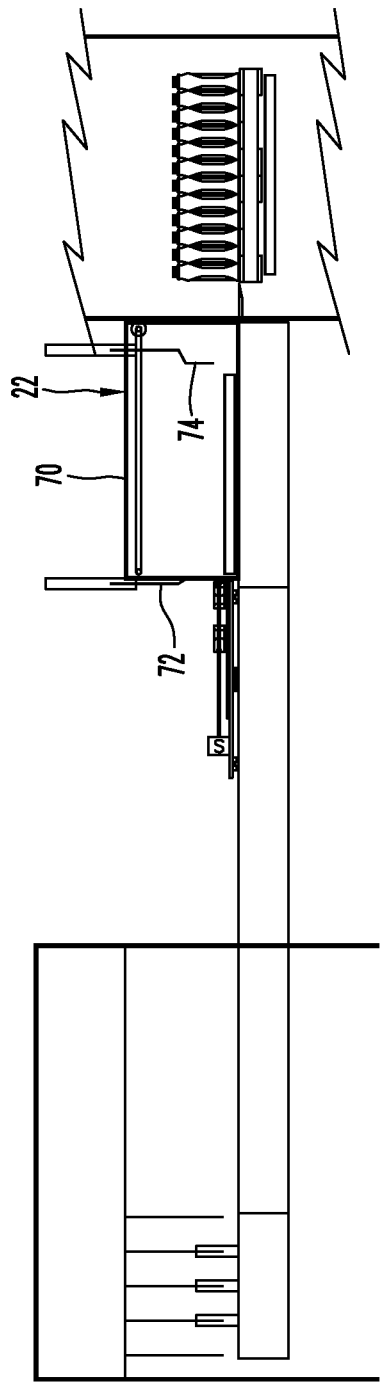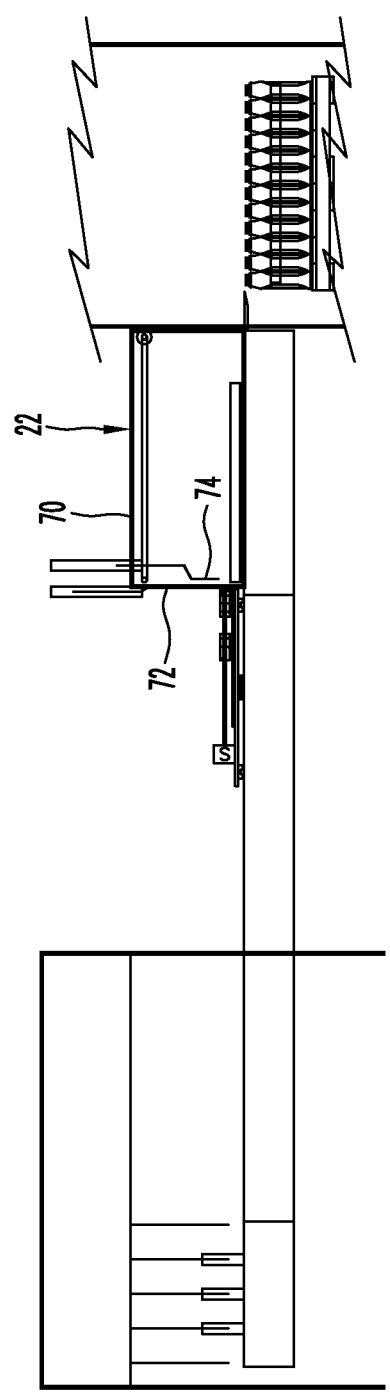

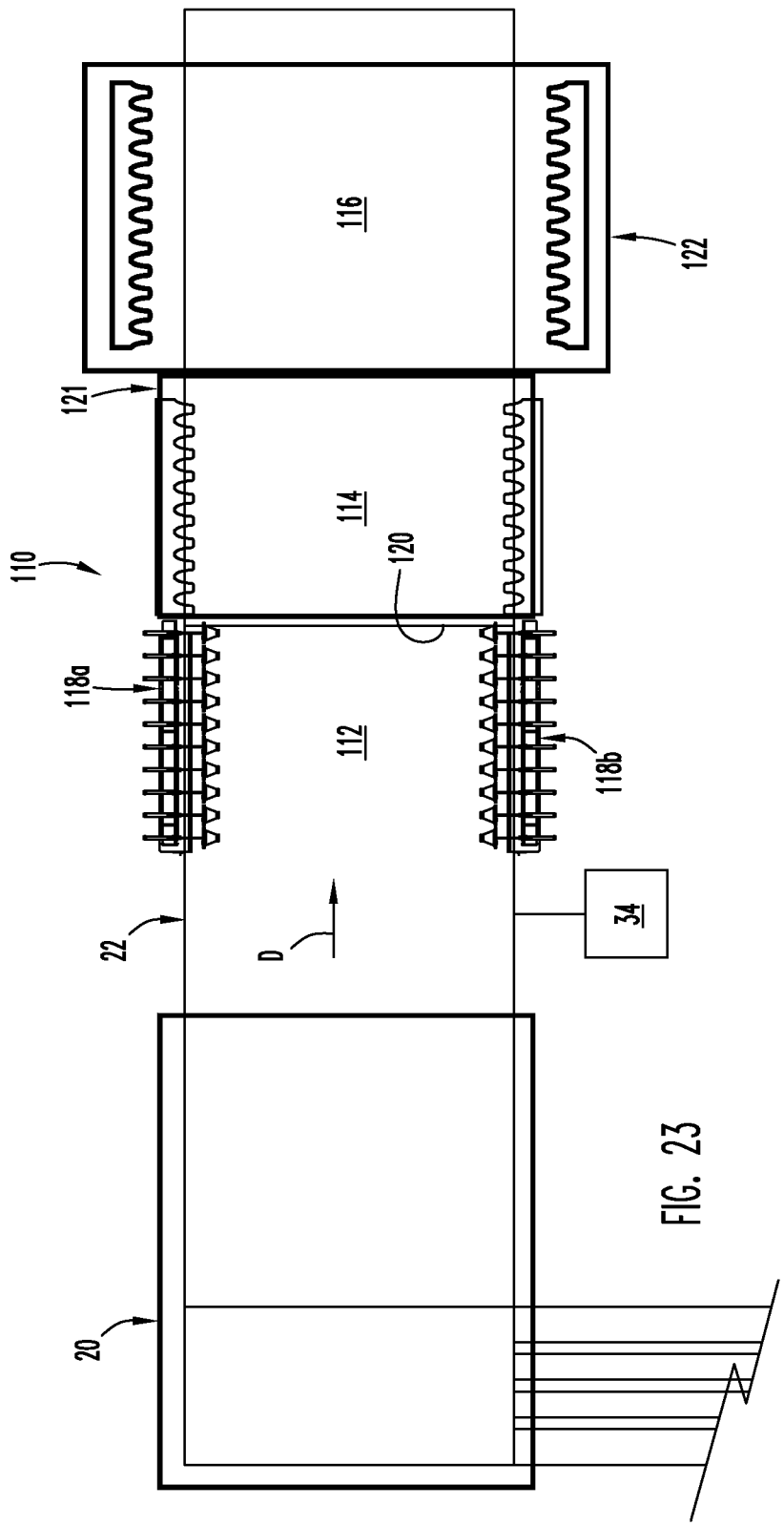

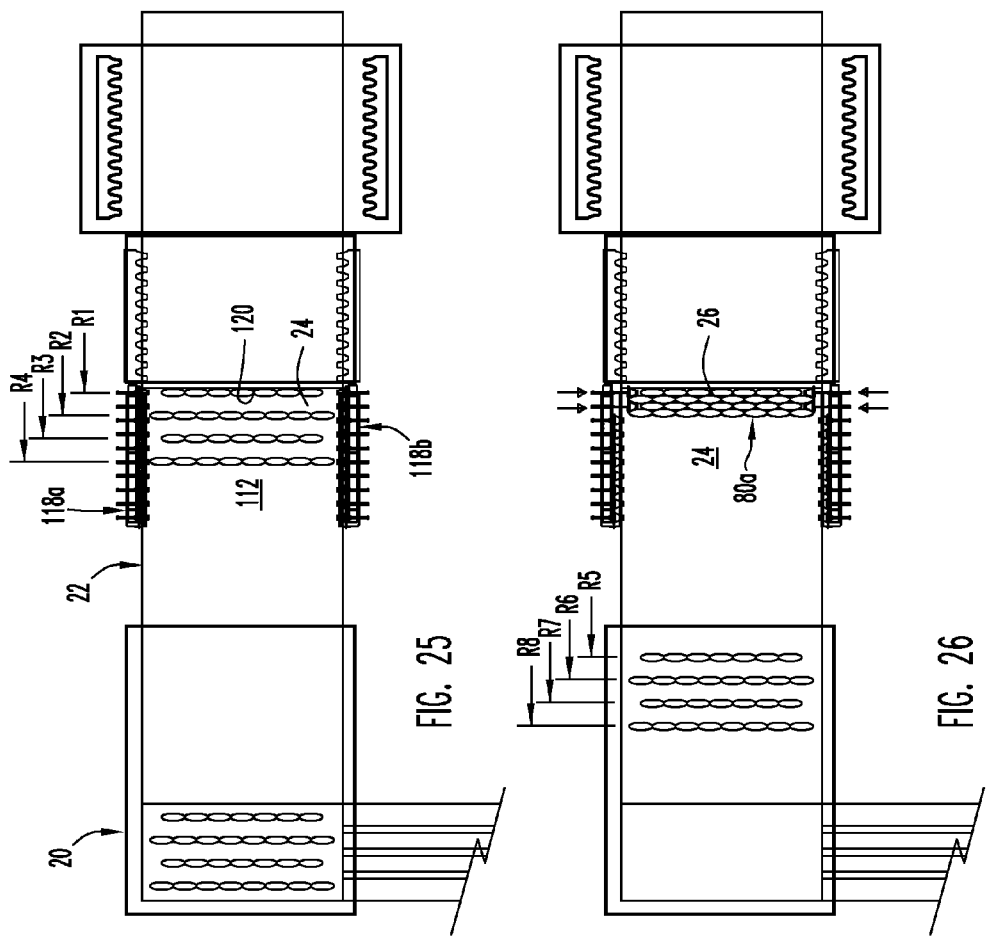

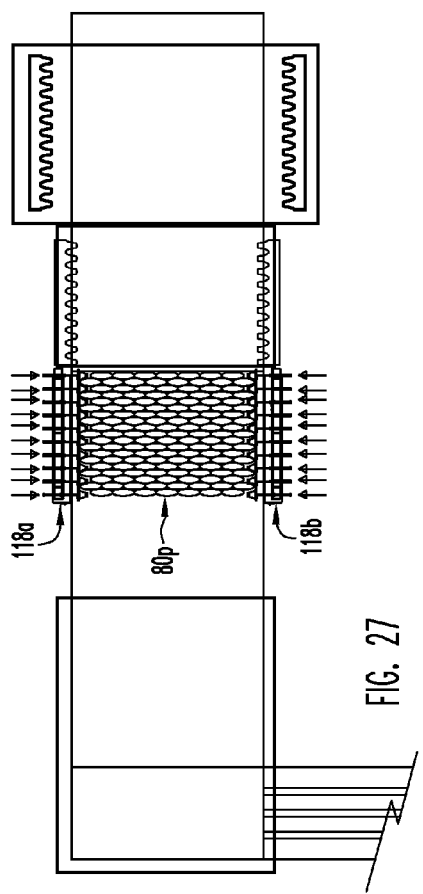
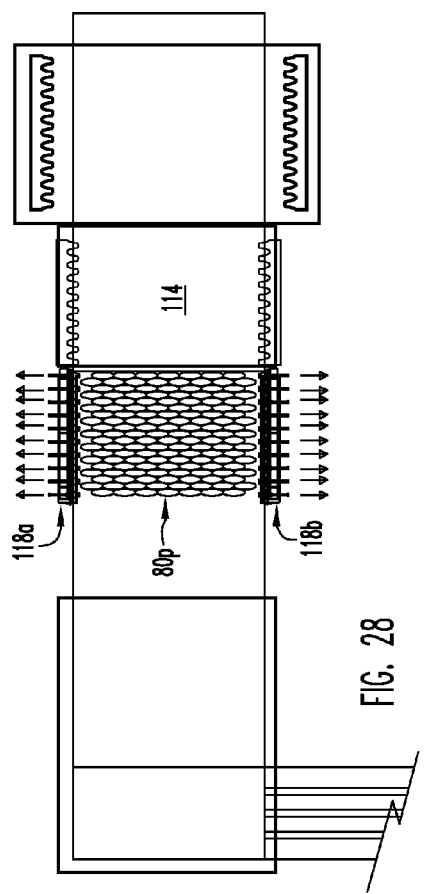

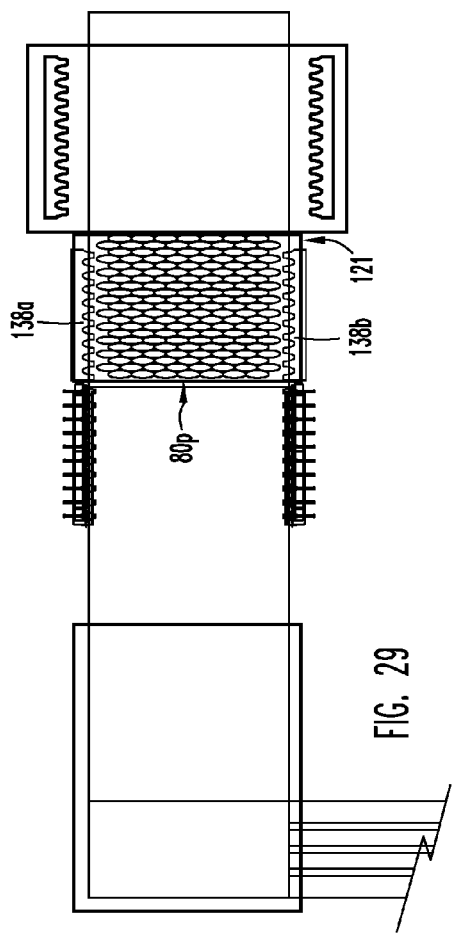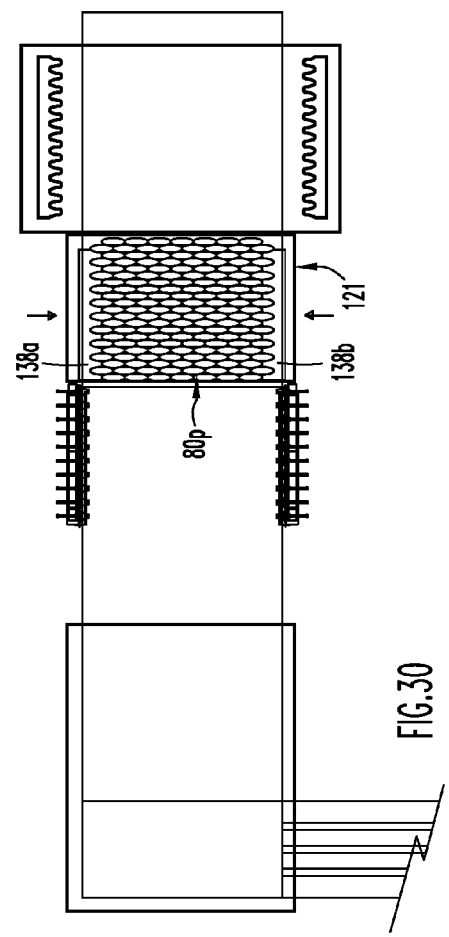

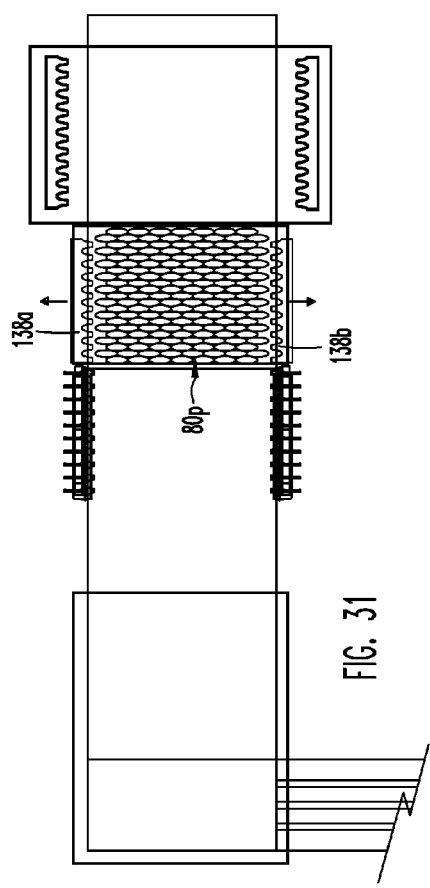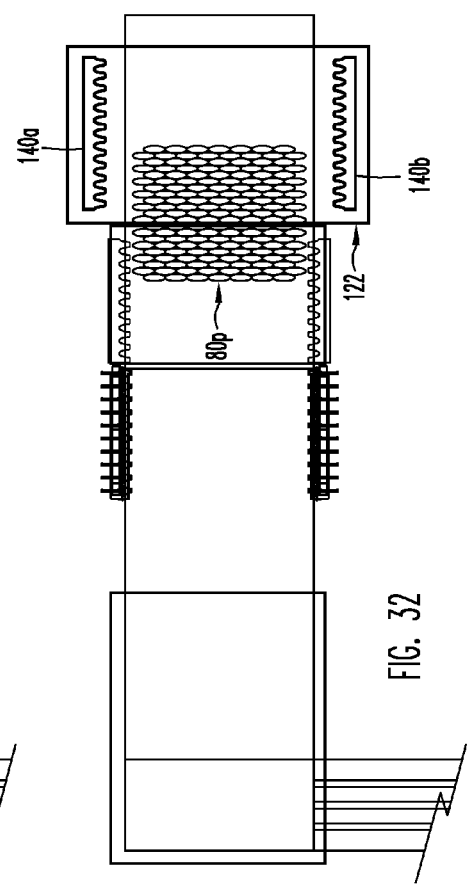
FIG. 31
FIG. 32

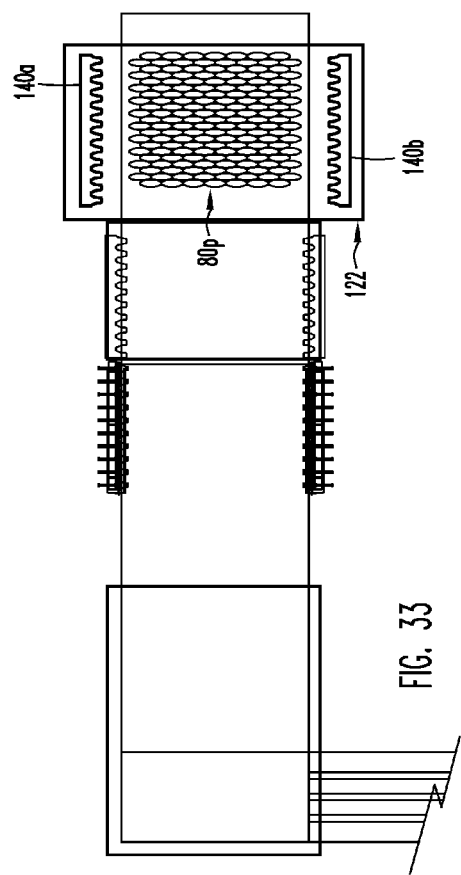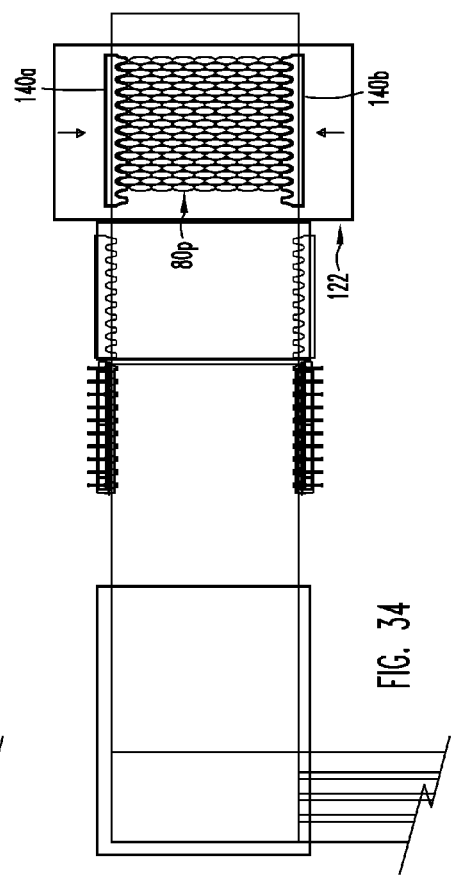

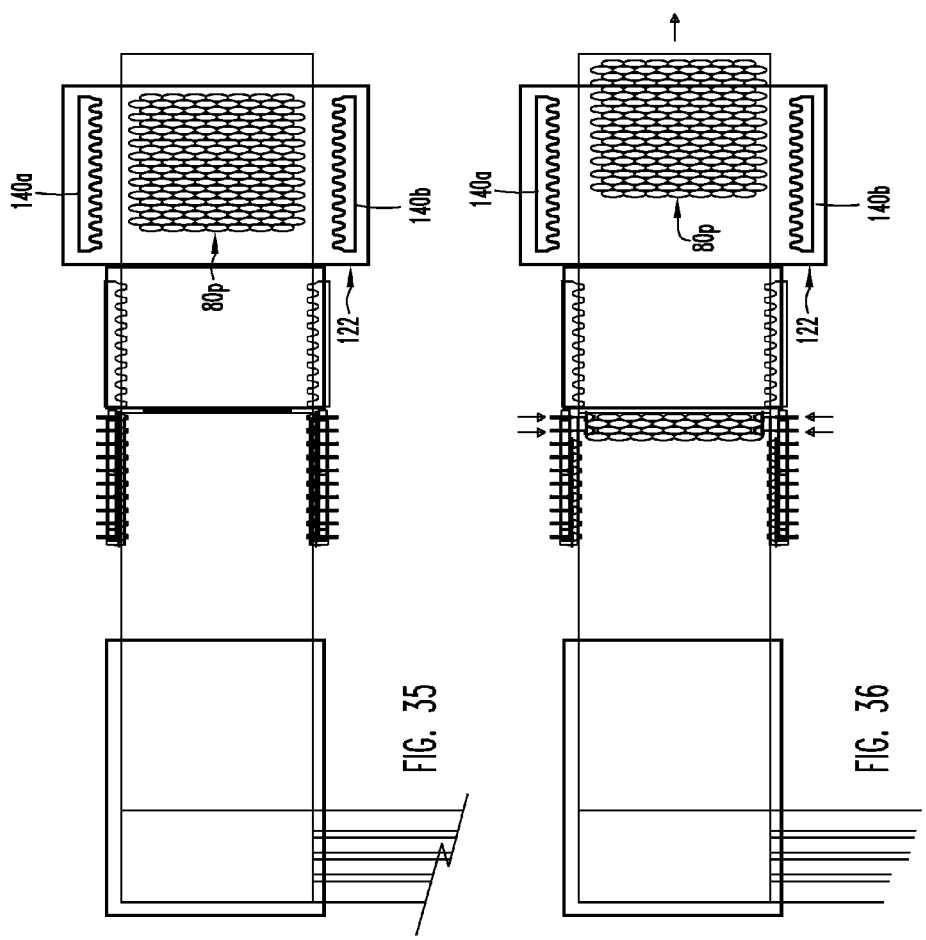

ARTICLE PATTERN FORMING METHOD AND APPARATUS

FIELD OF THE DISCLOSURE

The disclosure relates to organizing articles (containers, bottles, or like objects) into a pattern for transport.

BACKGROUND OF THE DISCLOSURE

In the container industry, empty containers are arranged into a pattern before the containers are moved for further processing. Often the patterned containers are moved onto a pallet for shipping. Round or circular containers are typically arranged into a nested pattern of rows and columns in which the containers of one row partially fit into the space between the containers of an adjacent row.

Circular and square containers can be self-patterning. Rows or streams of containers are placed on a conveyor and move to a pattern forming area. The incoming containers impact against the containers already in the pattern forming area, and the impact forces urge the containers to arrange themselves into the pattern.

When the receiving area receives enough containers to fill a pallet, the patterned containers are held in the pattern by a sweep. The sweep moves the patterned containers off the conveyor and onto the pallet. Examples of container palletizing systems that utilize self-patterning containers are disclosed in Simkowski, U.S. Pat. No. 5,522,692 and Slat et al. U.S. Pat. No. 5,733,100.

Not all containers are self-patterning. FIG. 1 illustrates portions of two rows R1 and R2 of non-round containers A forming part of a nested pattern of containers. Each container A includes convex front and rear surfaces B and convex side surfaces C. In forming the pattern, a container A in row R2 impacts against a pair of containers A in row R1. The impact force represented by the arrow I generates a torque T on the impacted containers in row R1. The torque T urges the containers to rotate. Containers A on the ends of row R1 may rotate 90 degrees and destroy the desired nested pattern.

Containers that are not self-patterning are often manually patterned. This is labor-intensive and the production rate is low.

Alternatively, rows of containers may be mechanically lifted from the conveyor and arranged in the desired pattern. Hischek et al. U.S. Pat. No. 6,688,839 discloses a container handling device that could possibly be adapted for use with non-self-patterning containers to move rows of containers from a conveyor belt and form a bottle pattern.

Such container handling devices are expensive, and the conveyors used with such handling devices must be dedicated for use with the handling device. Dedicated conveyors would remain idle during production runs of self-nesting containers.

Thus there is a need for an improved method for forming patterns of containers that are not self-patterning. The method should allow the use of conventional conveyors, and should enable the conveyors to be used with self-patterning containers.

SUMMARY OF THE DISCLOSURE

Disclosed is an improved method for forming patterns of containers that are not self-patterning. The method utilizes conventional conveyors, and the disclosed apparatus embodiments enable the conveyors to be used when palletizing self-patterning containers.

A method of forming a patterned row of non-self-patterning containers includes the steps of conveying a first row of containers in a first row pattern in a downstream direction to a pattern forming area, and then stopping downstream movement of the first row at a downstream end of the pattern forming area. The first row of containers extends along an axis transverse to the downstream direction and includes end containers located on opposite ends of the row.

A second row of containers in a second row pattern is conveyed downstream to the pattern forming area. The second row of containers extends along an axis transverse to the downstream direction and includes end containers located on opposite ends of the row. The second row of containers impacts against the stationary first row of containers, thereby stopping downstream movement of the second row of containers and forming a multi-row pattern of containers in the pattern forming area.

The first row of containers is between a pair of first surfaces when the second container row impacts against the first container row. Each first surface is in a first position adjacent to and facing a respective end container of the first row, the first surfaces each resisting displacement of the adjacent end container of the first row out of the first row pattern during impact.

The second row of containers is between a pair of second surfaces when the second container row impacts against the first container row. Each second surface is in a first position adjacent to and facing a respective end container of the second row, the second surfaces each resisting displacement of the adjacent end container of the second row out of the second row pattern during impact.

After the multi-row pattern of containers is formed in the pattern forming area, the first and second pairs of surfaces are moved away from the respective rows of containers.

In a preferred embodiment of the method, the multi-row pattern of containers is moved downstream from the pattern forming area to an accumulation area immediately after each of the first and second surfaces moves to its respective second position. The method is then repeated to form at least one additional multi-row pattern of containers in the pattern forming area. Each additional multi-row pattern of containers is moved downstream from the pattern forming area to the accumulation area, each additional multi-row pattern becoming part of a larger multi-row pattern of containers. When the multi-row pattern of containers in the accumulation area has grown to enough container rows to fill a pallet, the entire multi-row pattern of containers in the accumulation area is moved from the accumulation area and onto the pallet.

The first position of each first and second surface is established by the position of the adjacent end container associated with the surface. When forming a nested pattern, the containers in a row are axially offset along the row from the containers of an adjacent row. The axial positions of the first and second surfaces when in the first position are offset as needed to conform to the row pattern. The first and second surfaces move away from the rows after the multi-row pattern is formed to provide clearance for the multi-row pattern to move downstream to the accumulation area.

In the preferred embodiment of the method the container rows are conveyed on a conveyor, each container row extending between opposite sides of the conveyor. The first and second surfaces when in the second position are spaced away from the conveyer sides to enable the conveyor (with removable fixed side rails added if needed) to convey self-patterning containers to the pattern forming area.

In the preferred embodiment of the method, three or more rows of containers are conveyed to the pattern forming area to form a multi-row pattern of containers that is a subset of a full pallet, that is, the number of rows in the multi-row pattern is less than that of a full pallet. Additional pairs of surfaces are added as needed for placing adjacent the end containers of the additional rows to resist displacement of the containers during impact. Each subset when formed is moved from the pattern forming area to the accumulation area.

An apparatus for forming a multi-row pattern of containers in accordance with the above method includes a conveyor having a run that is movable downstream in a first direction, the conveyor run having opposite sides separated by a width of the conveyor run and an upper surface extending between the sides. A fence extends at least partially across the upper surface of the conveyor run, the fence configured to block further downstream movement of the containers against the fence.

A pattern forming device extends along a portion of the conveyor run upstream of the fence. The pattern forming device includes first and second fingers on opposite sides of the conveyer run, the first finger adjacent the first side and the second finger adjacent the second side, the first and second fingers spaced across from each along an axis generally perpendicular to the first direction and defining an axial gap therebetween.

Each finger is axially movable between a first position and a second position spaced from the first position, the finger moving towards the conveyor when moving from the second position to the first position and moving away from the conveyor when moving from the first position to the second position. At least a portion of each finger extends from the respective adjacent side of the belt run over the upper surface when the finger is in the first position, the gap between the first and second fingers less than the width of the belt run when both the first and second fingers are in the first position.

A controller, control system, or control unit is operatively connected to the first and second fingers, the control unit including a controller, a first drive connected to the first finger and a second drive connected to the second finger. Each of the first and second drives is operable by the controller to selectively move the finger connected to the drive between the first and second positions. The control unit further generates a control signal indicating that a row of containers moving downstream on the upper surface of the belt run is in registration with the gap defined between the first and second fingers. The control unit is responsive to the control signal to position each of the first and second fingers at each finger's first position.

With this apparatus, the fingers include the respective first surfaces that are placed adjacent the end containers of a first row of containers. In preferred embodiments, the fingers also include the respective second surfaces that move adjacent the end containers of the second row of containers. In more preferred embodiments, the fingers also include respective third surfaces that are placed adjacent the end containers of a third row of containers.

If subsets or an entire pallet pattern is formed at the pallet forming area, additional pairs of fingers are provided. If a subset of N rows are formed in the pattern forming area, then N DIV 2 (where DIV represents integer division) fingers having first, second, and third surfaces are needed to constrain the rows during impact.

In a preferred embodiment of the apparatus, the fence is selectively movable downstream through the accumulation area so that the last upstream row of containers in the accumulation area acts as a fence obstructing downstream motion of containers at the downstream end of the pattern forming area.

In one embodiment of the apparatus, the pairs of fingers associated with a container row are moved adjacent the container row upstream from impact and move downstream with the row to the impact point. In another embodiment of the apparatus, the pairs of fingers associated with a container row are fixed location with respect to the downstream direction of the conveyer and are placed at the impact point of the row.

The sweep preferably includes pattern holding side rails or forms extending downstream from the fence and forming opposite sides of the sweep. The side rails are contoured or profiled to correspond to the shape of the container pattern and maintain the pattern during movement of the conveyor, and when moving the pattern from the accumulation area to the pallet. The side rails are retractable to permit multi-row patterns to move from the pattern forming area to the accumulation area. The profiled side rails can be replaced with straight side rails when using the conveyor with self-patterning containers.

Other objects and features will become apparent as the description proceeds, especially when taken in conjunction with the accompanying drawing sheets.

BRIEF SUMMARY OF THE DRAWINGS

FIG. 3 is a side view of the apparatus shown in FIG. 1;

FIG. 4 is an enlarged top view of the pattern forming subassembly of the apparatus shown in FIG. 1;

FIGS. 5-22 are various top and side views illustrating operation of the apparatus shown in FIG. 1 in forming a multi-row pattern of containers;

FIG. 23 is a top view of a second embodiment apparatus for forming a multi-row pattern of containers;

FIGS. 25-36 are views similar to FIG. 23 illustrating operation of the apparatus shown in FIG. 23 in forming a multi-row pattern of containers.

DESCRIPTION OF THE PREFERRED EMBODIMENTS

Figure 1:
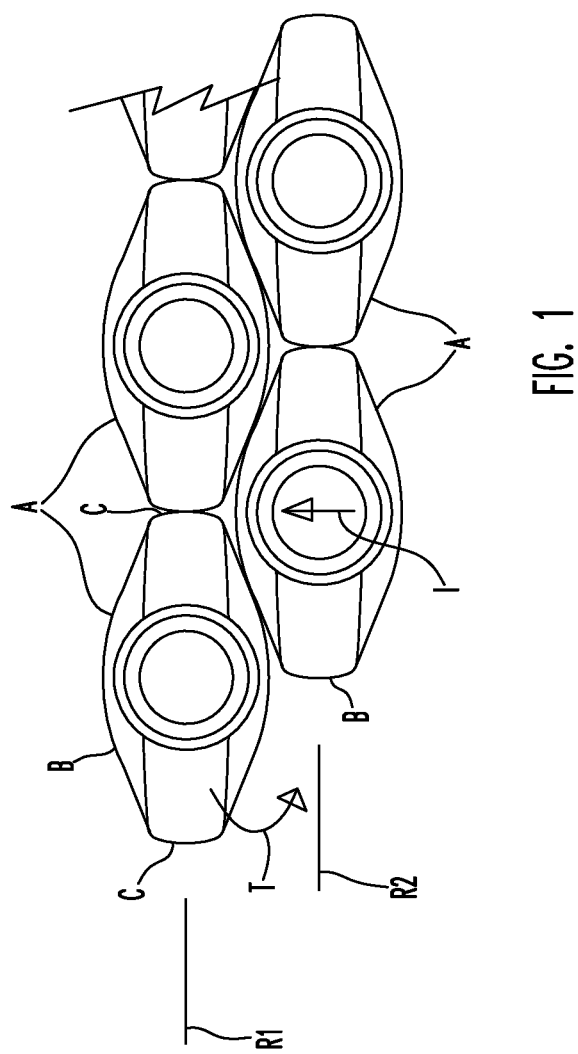
FIG. 1 is a top view of portions of two rows of non-round containers forming part of a nested pattern of containers.
Figure 2:
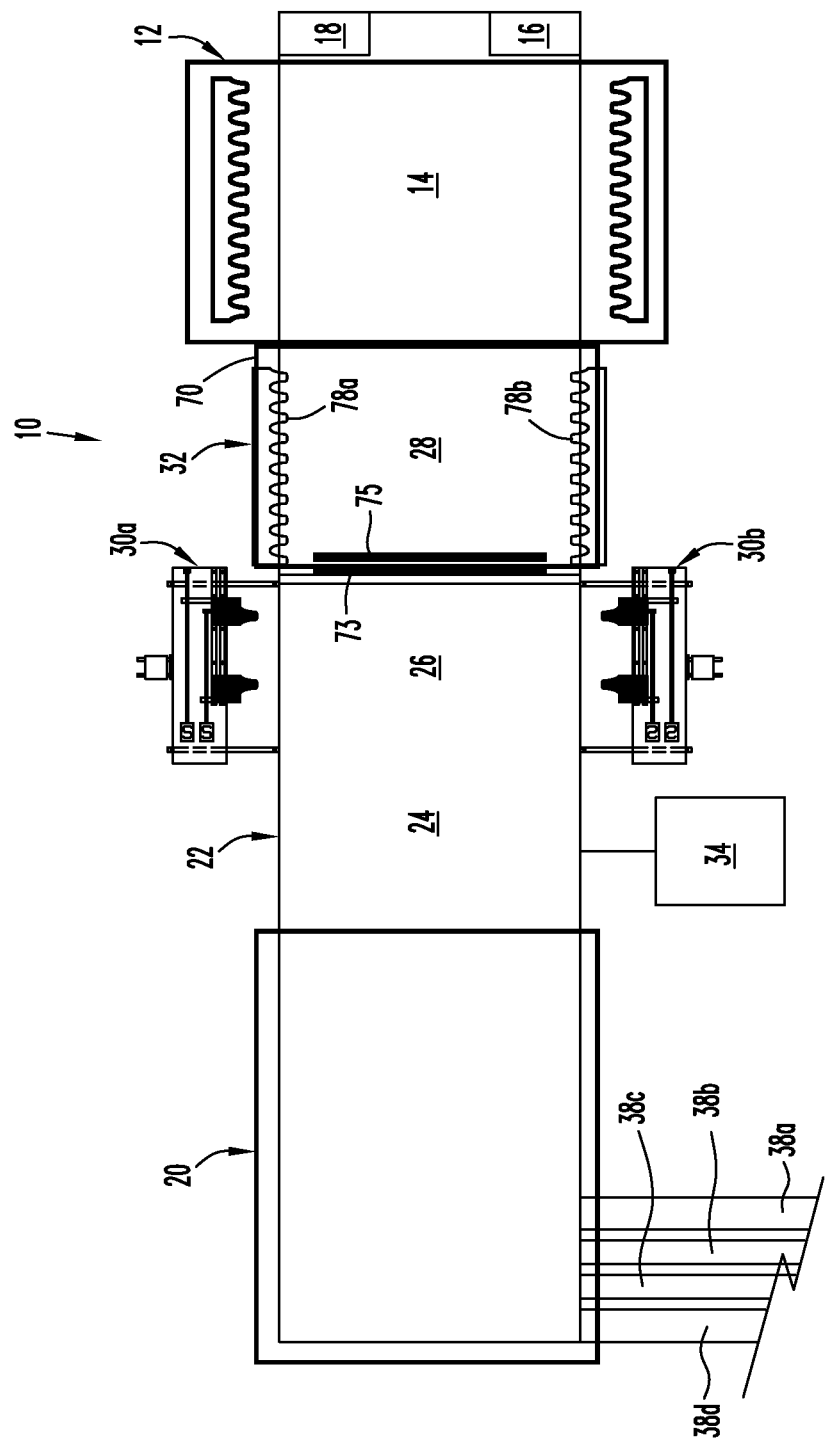
FIG. 2 is a top view of a first embodiment apparatus for forming a multi-row pattern of containers.

FIGS. 2 and 3 illustrate a first-embodiment apparatus 10 for forming a multi-row pattern of containers. The illustrated row-forming apparatus 10 forms a nested multi-row pattern of non-self-nesting containers A (see FIG. 1).

In the illustrated embodiment the apparatus 10 supplies a pallet tower 12 with nested patterns of containers A. The pallet tower 12 includes a conventional pallet elevator 14 that stacks layers of containers on a pallet P, a conventional sheet transfer unit 16 that places tier sheets or layer sheets between the container layers, and a conventional pallet conveyor system 18 that supplies empty pallets and removes filled pallets.

The pattern forming apparatus 10 includes an intake station 20 that receives rows of containers and a conveyor 22 extending in a downstream direction D from the intake station 20 to the pallet tower 12. The conveyor 22 is formed as a conveyor belt having a belt run with an upper surface 24 movable in the downstream direction. The conveyor 22 passes through a pattern forming area 26 and an accumulation area 28 downstream from the pattern forming area 26 to the pallet tower 12.

Extending along the pattern forming area 26 is a pattern forming device that includes a pair of pattern forming subassemblies 30a, 30b located on opposite sides of the conveyor 22. A sweep 32 is movable in the upstream and downstream directions between its intake position shown in FIG. 2 over the accumulation area 28 and its discharge position over the pallet elevator 14. A control system 34 controls automatic operation of the apparatus 10.

The intake station 20 includes a stationary support table 36 that receives rows of empty containers. In the illustrated embodiment the support table 36 receives four rows of containers from respective infeed lanes 38a, 38b, 38c, and 38d. A conventional overhead sweeping pusher 40 pushes the rows of containers off the support table 36 and onto the conveyor surface 24.

FIG. 4 is an enlarged view of the pattern forming subassembly 30a. The subassembly 30a includes a flat, horizontal mounting plate 42 movably mounted on a pair of carriage rails 44a, 44b that extend perpendicular to the conveyor belt 22. The upper face 46 of the mounting plate 42 is vertically spaced slightly above the upper belt surface 24. The mounting plate 42 is positioned along the rails 44 in extended or retracted positions by a pneumatic drive 48.

A pair of pattern forming fingers 50, 52 are each supported on a pair of slide rails 54a, 54b attached to the upper plate surface 46 for movement parallel with the conveyor belt 22. Each finger 50, 52 is independently movable along the slide rails 54 by a respective servo drive motor 56a, 56b that controls the speed and position of the finger via a drive screw 58a, 58b attached to the finger.

The downstream finger 50 is formed from flat plate and extends from the mounting plate 42 towards the conveyor 22 to a free end having a first or end surface 60. A first concave surface 62 extends downstream and towards the mounting plate 42 from the first end surface 60 to a second surface 64. A second concave surface 66 extends upstream and towards the mounting plate 42 from the first end surface 60 to a third surface 68.

The upstream finger 52 is similar to the finger 50 but is flipped over to be in a mirrored relationship with the finger 50 as can be seen in FIG. 4. The corresponding surfaces are numbered with the same reference numerals as used for finger 50 but are in a mirror relationship with the corresponding surfaces of the finger 50.

The pattern forming subassembly 30b is similar to the subassembly 30a but is mirrored with the subassembly 30a with respect to the downstream direction D. The elements of the subassembly 30b are identified by the same reference numerals used for the corresponding elements of the subassembly 30a in the description below.

When the corresponding pairs of upstream and downstream fingers 50, 52 subassemblies 30a, 30b are axially opposite one another as shown in FIG. 2, the first finger surfaces define a first gap between them, the second fingers define a second gap downstream from and larger than the first gap, and the third finger surfaces define a third gap upstream from the first gap that is the same size as the second gap.

As best seen in FIGS. 2 and 3, the sweep 32 includes a frame 70 that defines the upstream and downstream ends of the sweep. Mounted on the upstream end of the sweep 32 is a vertically movable end plate 72 that extends across the width of the conveyor surface 24. The plate is raised and lowered via a drive 73.

An indexable internal fence or end plate 74 also extends across the width of the conveyor surface 24. The fence 74 is vertically movable via a drive 75. The fence 74 along with its drive 75 is also selectively positionable in the upstream and downstream directions along the frame 70 by a chain drive 76 between a most upstream position shown in FIG. 3 and a most downstream position shown in FIG. 19. When the sweep 32 is over the accumulation area 28 as shown in FIG. 2, the fence 74 when at its most upstream position defines the downstream end of the pattern forming area 26 and the beginning of the accumulation area 28.

A pair of elongate side pattern holding forms or side rails 78a, 78b are located on opposite sides of the conveyor belt 22 and extend in the downstream direction from the upstream end of the frame 70. The inner sides of the sweep side rails 78 are contoured or profiled to conform to the container pattern that will be formed at the pattern forming area. The sweep side rails 78 are each movable from an extended position in which the side rail partially overlaps the belt surface 24 to a retracted position away from the conveyor belt 22.

Operation of the row-forming apparatus 10 is described next.

FIGS. 2 and 3 illustrate the apparatus 10 in its initial operating condition prior to receipt of any containers A. The conveyor 22 is stopped. The sweeping pusher 40 is in its retracted position. The mounting plates 42 of the pattern forming subassemblies 30a, 30b are in their retracted positions away from the conveyor 22, with the fingers 50, 52 of each subassembly 30a, 30b spaced away from the conveyor 22. Each pair of fingers 50, 52 are in their upstream positions along the conveyor 22. The sweep 32 is at its upstream position above the accumulation area 28, with the sweep end plate 72 raised and the indexed fence 74 lowered and in its upstream position along the frame 70. The sweep side rails 78 are in their extended position. The pallet elevator 14 has positioned the empty pallet P even with the conveyer surface 24.

FIGS. 5 and 6 illustrate the row-forming apparatus 10 after four rows R1, R2, R3, R4 of containers A have been supplied from the feed rails 38 in a conventional manner onto the support table 36. In the illustrated embodiment, each container row R extends along a respective row axis perpendicular to the conveyor downstream axis. The rows R are spaced apart in a column axis parallel with the downstream axis and the rows are spaced apart along the column axis a distance substantially greater than the column depth of the container.

The four rows R alternate between rows R1 and R3 having eight containers each and rows R2 and R4 having seven containers each. The containers in the rows R2 and R4 are offset along the row axis a half-container width so that the container rows will form a nested pattern. The rows R1-R4 are positioned so as to be centered between the sides of the conveyor belt 22, and so ends of the shorter rows R2 and R4 are spaced inwardly a half-container width as compared to the row ends of rows R1 and R4.

The overhead sweeping pusher 40 pushes the rows of containers R1-R4 onto the conveyor belt surface 24 in a conventional manner, maintaining the table spacing between rows. The conveyor 22 is started and the rows of containers R1-R4 move downstream on the conveyor surface 24 to the pattern forming area 26.

FIGS. 7 and 8 illustrate the pattern forming apparatus 10 when the leading container row R1 reaches and impacts against the sweep's internal fence 74 positioned at the downstream end of the pattern forming area 26. The fence 74 stops further downstream movement of the container row R1.

At impact of container row R1 with the fence 74, the second row R2 is between the downstream fingers 50 and the fourth row R4 is between the upstream fingers 52 of the pattern forming subassemblies 30a, 30b. The control system 34 includes sensors (not shown) that generate a control signal when the rows R2 and R4 move into axial registration with respective pairs of fingers 50, 52. The control system responds to the control assembly by moving the subassembly mounting plates 42 towards the conveyor 22 from their retracted positions shown in FIGS. 7 and 8 to their extended positions shown in FIG. 9.

Figure 9:
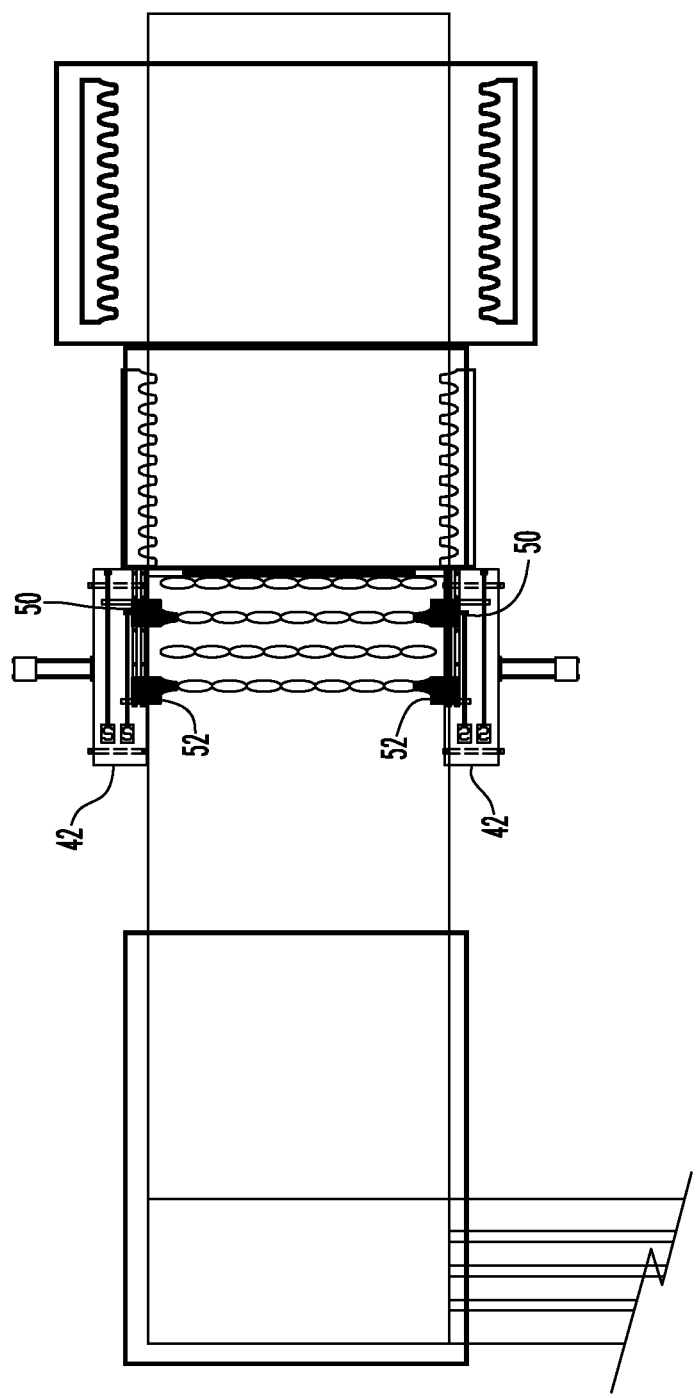

When to plates 42 move to their extended positions, the free ends of the pairs of fingers 50, 52 are closely spaced from the containers on the ends of the rows R2 and R4 (in the illustrated embodiment the fingers are each spaced about one-quarter inch from the adjacent container) as shown in FIG. 9. The control system 34 also causes the fingers 50, 52 to begin moving downstream at the same speed as the conveyor surface 24, maintaining axial alignment of the fingers with their respective container rows as the rows continue to move downstream.

Container rows R2, R3, and R4 and the pair of fingers 50, 52 continue to move downstream on the conveyor belt towards the stationary row R1. As the fingers 50 and the row R2 approaches and nears stationary row R1, the end surfaces 64 on the finger 50 move adjacent the end containers of the row R1.

Figure 10:
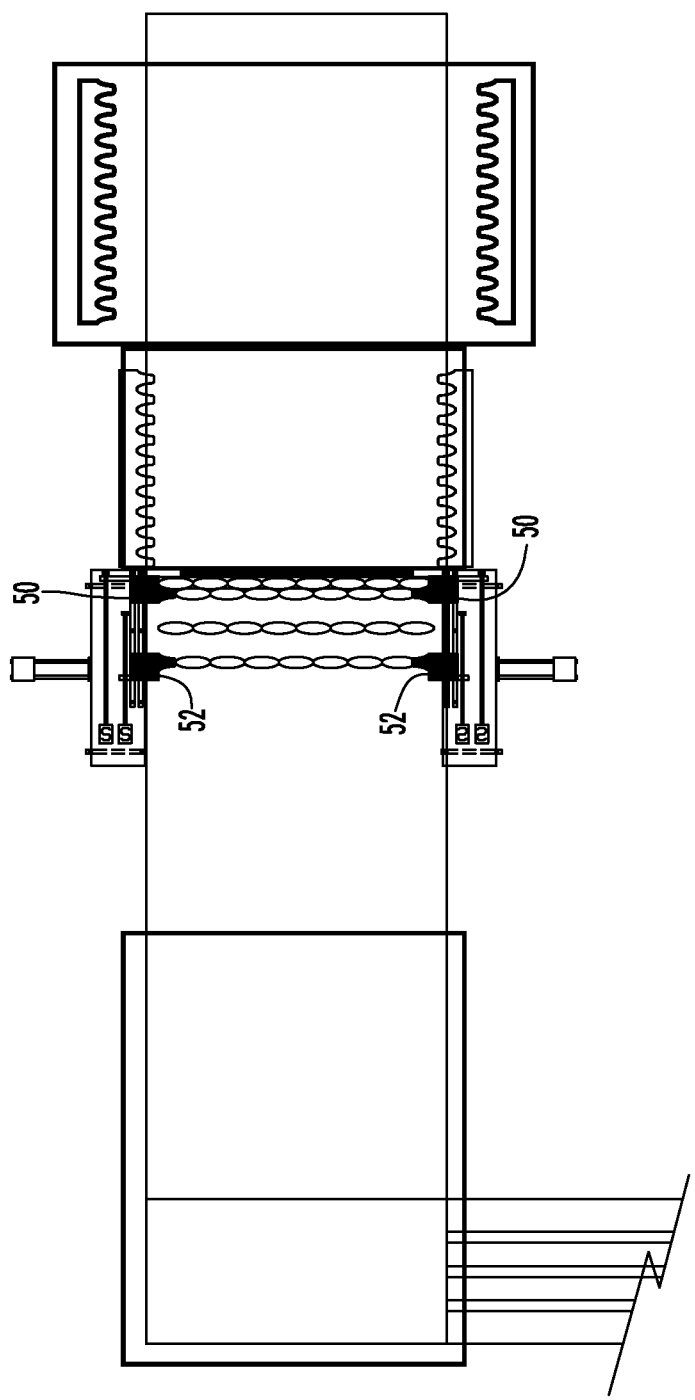

FIG. 10 illustrates the apparatus 10 when container row R2 impacts row R1. The downstream fingers 50 have reached the end of downstream travel, and the control system stops downstream movement of the fingers 50. The impact generates forces urging the containers out of the desired nesting pattern as previously described. The containers in R1 are constrained to remain in the pattern by the fingers 50 end surfaces 64, and the containers in row R2 are constrained to remain in the pattern by the fingers 50 end surfaces 64. The fingers 50 concave surfaces 62 are closely spaced from the end containers in row 1, further constraining the end containers in row R1.

As shown in FIG. 10, row R3 is spaced upstream from row R2 when row R2 impacts row R1. The conveyor continues to move row 3 and row 4 downstream, with upstream fingers 52 moving downstream in axial alignment with row R4 and towards now stationary fingers 50. As row R3 approaches and nears stationary row R2, the end containers of Row 3 move adjacent the end surfaces 68 of the fingers 50.

Figure 11:
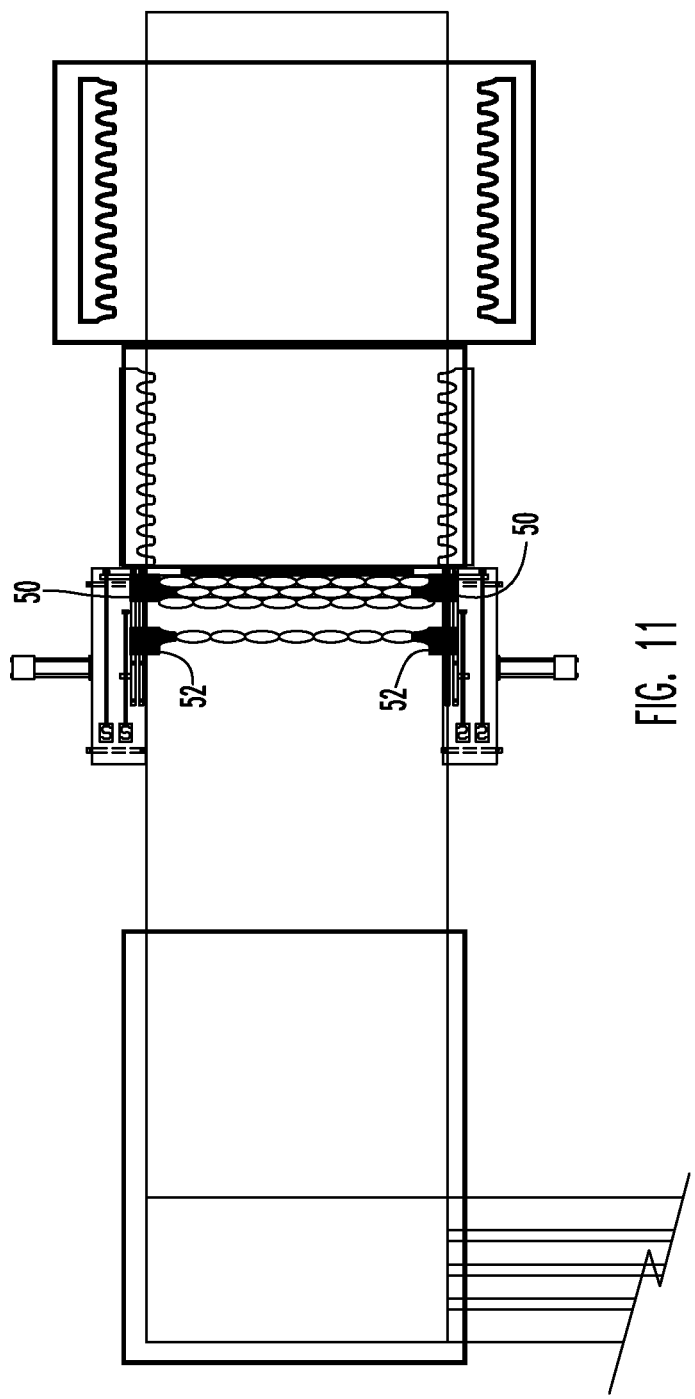

FIG. 11 illustrates the apparatus 10 when container row R3 impacts row R2. The containers in row R3 are constrained to remain in the nesting pattern by the fingers 50 end surfaces 68, and the containers in rows R1 and R2 remain constrained by the fingers 50 end surfaces 64 and 60 respectively.

As shown in FIG. 11, container row R4 is spaced upstream from row R3 when row R3 impacts row R2. The conveyor 22 continues to move row 4 downstream, with upstream fingers 52 moving downstream in axial alignment with row R4 towards now stationary fingers 50. As the fingers 52 and container row R4 approach stationary container row R3, the fingers 50 move adjacent the end containers of container row R3.

FIG. 12 illustrates the apparatus 10 when container row R4 impacts row R3. The downstream fingers 52 have reached the end of downstream travel, and the control system stops downstream movement of the fingers 52. The containers in row R4 are constrained to remain in the nesting pattern by the fingers 52 end surfaces 60, and the containers in rows R1, R2, and R3 remain constrained by the fingers 50 end surfaces 68, 60, and 64 respectively. The concave surfaces 66 of fingers 52 are closely spaced from the concave surfaces 66 of the fingers 50 and partially surround the end containers of row R3, further constraining the end containers in row R3.

When container row R4 impacts row R3 and becomes stationary, a nested container subset 80 formed from nested rows R1, R2, R3, R4 is stationary on the conveyor 22 against the fence 74. The control system 34 moves the mounting plates 42 to their retracted positions shown in FIG. 13, and the pairs of fingers 50, 52 return to their upstream positions for forming a new container subset.

The indexing fence 74 moves downstream and the conveyor 22 moves the subset 80 downstream into the accumulation area 28. The indexing fence 74 stops when the upstream row R4 of the container subset 80 is adjacent the end of the pattern forming area 26, resisting further downstream movement of the subset 80. See FIG. 14. The side plates 78 then move to their extended positions and partially capture the end containers of the subset 80 as shown in FIGS. 15 and 16.

The side plates 78 and the fence 74 cooperate to maintain the nested pattern in the accumulation area while the next subset is formed in the pattern forming area 26.

A second container subset is formed in the pattern forming area 26 as described previously. The first row R1 of the second subset will impact against the most upstream row of containers in the accumulation area, see FIG. 17. After the first container subset is formed and moved into the accumulation area, the containers in the accumulation area define the fence that stops movement of the first subset row at the downstream end of the pattern forming area 26.

The side rails are moved to their retracted positions as shown in FIG. 14 when each of the container subsets move into the accumulation area 28, and return to their extended positions after the last upstream row of the subset has moved into the accumulation area as previously described.

In the illustrated embodiment a full pallet container pattern 82 is formed after the second and third container subsets move into the accumulation area, see FIG. 18. The indexing fence 74 has moved to the downstream end of the frame 70, and the side rails 78 are in their extended position and partially capture the end containers of all the container rows.

The upstream fence 72 is lowered and the sweep 22 moves the pallet container pattern 82 over the pallet elevator 14 to stack the pattern 82 on the pallet P, see FIG. 19. The pallet elevator 14 can include extendable/retractable profiled side rails 86a, 86b (see FIG. 2), similar to side rails 78a, 78b, to assist in maintaining the nested container pattern during transfer onto the pallet P.

After the sweep 33 has moved over the elevator 14, the upstream and downstream sweep fences 72 and 74 are raised and the now empty sweep 22 returns to the accumulation area 28. The upstream fence 72 remains raised and the downstream fence 74 is then lowered and returned to its upstream position, see FIGS. 20 and 21. The apparatus 10 is thereby returned to the initial state shown in FIGS. 2 and 3 to form another pallet container pattern.

The row forming apparatus 10 can be quickly modified for use with self-patterning containers. The mounting plates 42 are moved to their retracted positions, and straight side rails can be placed along the conveyor 22. The side rails 78 can be replaced with straight rails or profiled side rails as needed. The indexing fence 74 can be positioned as necessary for use of the sweep 22 with the self-nesting pattern.

The illustrated apparatus 10 is capable of forming container subsets having up to five container rows, the fifth container row being received between the surfaces 64 of the upstream fingers 52 when the fifth container row impacts the fourth container row.

If the container subsets are formed from more than five rows, or if an entire pallet pattern is to be formed in the pattern forming area, additional pairs of upstream fingers, similar to fingers 50, 52 can be provided as needed to constrain all the rows being formed in the pattern forming area 26.

In the illustrated embodiment, each pair of fingers 50, 52 are moved to their extended position and into axial alignment with a container row while the container row is spaced upstream from impact. The pair of fingers 50, 52 then move downstream with the container row to impact. In other possible embodiments, the pairs of fingers 50, 52 can be stationary along the conveyor path where the row would impact the stationary downstream row of containers. For example, pairs of fingers 50, 52 can be fixed along the conveyor path at the positions shown in FIG. 14, and would be independently movable between retracted and extended positions. The control system 34 would extend a pair of fingers essentially when the row associated with the fingers moves into alignment or registration with the fingers as the row is about to impact.

The fingers 50, 52 are profiled and sized to conform to the profile of the container subset formed at the form pattern area 26. Other container subset patterns are known and the profiles of the fingers 50, 52 can be changed accordingly. For example, the containers A could be arranged in rows with the same number of containers in each row but with each row offset with respect to the next adjacent row by a half container width.

The illustrated fingers 50, 52 each have three container constraining surfaces, enabling the finger to constrain more than one row of containers. In other embodiments, a finger could have a different number of constraining surfaces. For example, for some bottle configurations it may be desirable to have a pair of fingers dedicated to each row of the container subset and each finger may have only one constraining surface that is placed adjacent the end container of the row.

Figure 24:
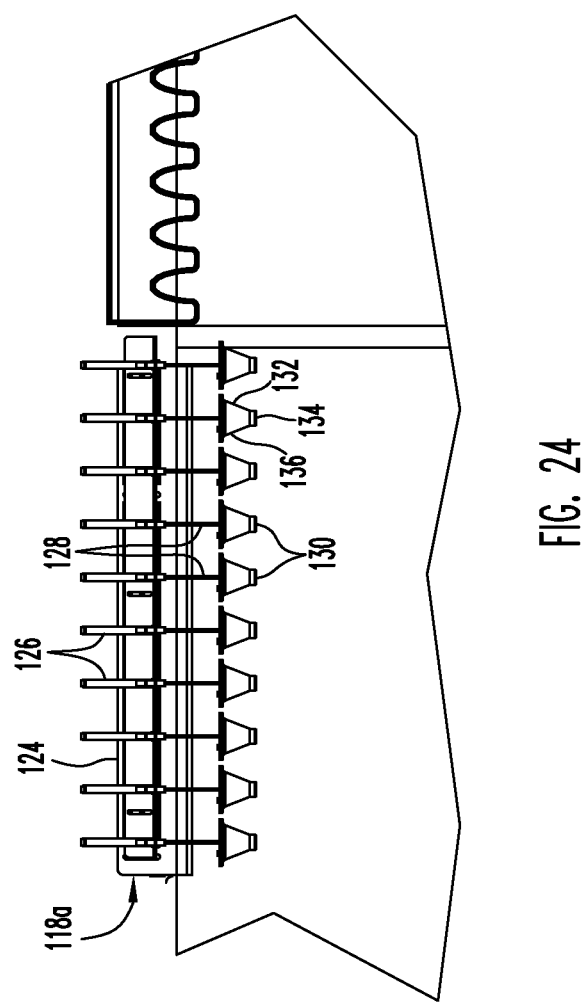
FIG. 24 is an enlarged top view of the pattern forming subassembly of the apparatus shown in FIG. 23.

FIGS. 23 and 24 illustrate a second-embodiment apparatus 110 for forming a multi-row pattern of containers and having fingers whose positions are fixed along the conveyor path. The illustrated row-forming apparatus 110 forms a nested multi-row pattern of non-self-nesting containers A, but does so by forming container subsets that remain stationary on the conveyor belt until a full pallet container set is formed. The pattern forming area moves upstream, with the downstream pattern forming areas becoming portions of the accumulation area as the container subsets are sequentially formed.

The apparatus 110 includes a number of components that are essentially the same as the apparatus 10; the same reference numbers used in the description of the apparatus 10 will identify these common components in the description of the apparatus 110.

The apparatus 110 includes a conveyor 22 extending in a downstream direction D from an intake station 20 to a pallet tower (not shown). The conveyor 22 passes through a pattern forming/accumulation area 112, a slipsheet transfer area 114, and a sweep area 116 that is adjacent the pallet tower.

Extending along the pattern forming/accumulation area 112 is a pattern forming device that includes a pair of pattern forming subassemblies 118*a*, 118*b* located across from each other on opposite sides of the conveyor 22. A vertically movable end plate or fence 120 (similar to the fence 72 but in a fixed location along the belt 22) separates the areas 112, 114. A conventional slipsheet dispenser/placer 121 is located along the slipsheet transfer area 114. A conventional sweep 122 is normally located above the sweep area 116. A controller or control unit or control system 34 controls automatic operation of the apparatus 110.

FIG. 24 is an enlarged view of the pattern forming subassembly 118*a*, the pattern forming subassembly 118*b* being essentially a mirror image of the subassembly 118*a*. The subassembly 118*a* includes an elongate mounting plate 124 extending along one side of the conveyor 22. Mounted on the top of the plate 122 is a set of uniformly spaced apart fluid cylinders 126, with piston rods 128 extending from the cylinders 126 towards the belt 22. Mounted on the free ends of the piston rods 128 are like fingers 130, each finger 130 having a generally concave downstream-facing surface 132, a generally planar surface 134 parallel with the downstream direction D, and a generally concave upstream-facing surface 136.

The cylinders 126 drive the piston rods 128 between extended positions shown in FIG. 24 and retracted positions as shown in FIG. 25. When the piston rods 128 are in their extended positions the fingers 130 are over the belt 22 and away from the cylinders 126. When the piston rods 128 are in their retracted positions the fingers 130 are immediately adjacent the cylinders 126.

The control unit 34 selectively controls operation of each of the cylinders 126 of the subassemblies 118*a*, 118*b* to individually control positioning of each finger 130 in extended and retracted positions.

Operation of the row-forming apparatus 110 is described next.

FIG. 25 illustrates the apparatus 110 in an operating condition with an initial four rows R1-R4 of containers delivered from the station 20 moving on the conveyor 22 towards a pattern forming area 24 in the area 114 immediately upstream from the fence 120. The four rows of containers are arranged in a manner similar to the alternating row arrangement delivered by the station 20 of the apparatus 10 except that the shorter row of containers is now the leading row. The fingers 130 of the pattern forming subassemblies 118*a*, 118*b* are in their retracted positions to not interfere with downstream movement of the rows R1-R4 towards the fence 120.

FIG. 25 illustrates the rows of containers when the leading container row R1 impacts against the fence 120. The row R1 is in axial registration with and between the finger faces 134 of the most downstream fingers 130 of the pattern forming assemblies 118*a*, 118*b*. The control unit 34 has sensors (not shown) that generates a control signal (not shown) when the row R1 moves into registration with the most downstream fingers 130; in response the control unit 34 moves the most downstream fingers 130 to their extended positions, the finger surfaces 132 moving towards each other to be closely spaced from respective left and right outer containers of the row R1.

When the row R2 impacts the row R1, the respective left and right outer containers of the row R2 are received in and are closely spaced from the upstream concave surfaces 136 of the most downstream pair of fingers 130. The surfaces 134, 134 cooperate to constrain rows R1, R2 at impact to maintain the desired container pattern.

When the row R3 impacts the row R1, the row R3 is in axial registration with the penultimate pair of downstream fingers 130. The control unit 34 sensors generate a control signal when the row R3 is in registration with the penultimate pair of downstream fingers 130. In response to control signal the control unit 34 moves those fingers to their extended positions to constrain the rows R2, R3 at impact, the left, right end containers of the row R2 being received in the downstream-facing surfaces 132 of the penultimate downstream pair of fingers 130.

When the row R4 impacts the row R3, the respective left and right outer containers of the row R4 are received in and are closely spaced from the upstream facing surfaces 136 of the penultimate pair of downstream fingers 130. The surfaces 134, 136 cooperate to constrain rows R3, R4 at impact to maintain the desired container pattern.

FIG. 26 illustrates the apparatus 110 after forming a nested subset 80*a* of containers from rows R1-R4, and with a second set of four container rows R5-R8 supplied from the station 20 to form a second container subset being conveyed on the belt 22 towards the pattern forming area 24 immediately upstream from the container subset 80*a*. The fence 120 maintains the subset 80*a* stationary on the belt 22, thereby converting the previous pattern forming area 24 into an accumulation area 26 for the formed subset 80*a* while the remainder of the pallet container set is being formed. The downstream and the penultimate pair of downstream fingers 130 (indicated by the arrows in FIG. 26) remain in their extended positions and maintain the container pattern of the subset 80*a* as the next succeeding rows of containers R5-R8 move towards the pattern forming area 24.

When the leading row R5 impacts the stationary row R4, the row R4 is in axial registration with the most downstream pair of retracted fingers 130. The control unit 34 generates a control signal when the row R5 moves into registration with those fingers to extend those fingers 130. When the row R6 impacts the now stationary row R4, the row R6 is in axial registration with the now most downstream pair of retracted fingers 130. The control unit 34 generates a control signal that causes those fingers 130 to move to their extended positions. In the same manner as the two most downstream pairs of retracted fingers 130 are successively extended to maintain the desired pattern of the subset 80*a*, the next two most downstream pairs of retracted fingers 130 are successively extended to maintain the desired pattern of the subset formed from the container rows R5-R8.

This process is continued for the next three sets of four container rows to form the entire pallet set 80*p* of containers as shown in FIG. 27. When the pallet container set 80*p* is fully formed, all the opposing pairs of fingers 128 of the pattern forming assemblies 118*a*, 118*b* are in their extended positions.

After the pallet container set 80*p* is formed, all the pairs of fingers 130 are moved to their retracted positions as shown in FIG. 28. This enables the container set 80*p* to move downstream on the conveyor belt 22 under the raised fence 120 and to the sheet transfer area 114, see FIGS. 29 and 30. A pair of side rails 138*a*, 138*b* (similar to the rails 78*a*, 78*b* of the apparatus 10) close on the pallet container set 80*p* to maintain the container pattern while a slipsheet (not shown) is placed over the pallet container set 80*p* by the slipsheet provider 121.

The conveyor belt 22 then moves the pallet set 80*p* into the sweep area 116, the pallet set entering the sweep 122. See FIGS. 31-34. A pair of side rails 140*a*, 140*b* close on the pallet container set 80*p* to maintain the container set stationary in the sweep area 116 as a second container set (not shown) is formed between the pattern forming subassemblies 118*a*, 118*b* as previously described. The sweep 122 then moves the container set 80*p* onto the pallet tower, see FIGS. 35 and 36.

The illustrated row-forming apparatus 110 has 10 pairs of facing fingers 130 to form a pallet container set 80*p* having 21 rows of containers (made up of 5 sets of 4-row container subsets and an additional single row of containers). In other embodiments, the pairs of facing fingers 130 can vary depending on the number of container rows making up the pallet container set.

While this disclosure has illustrated and described a preferred embodiment or embodiments, it is understood that this is capable of modification, and we therefore do not wish to be limited to the precise details set forth, but desire to avail ourselves of such changes and alterations as fall within the purview of the following claims.

What we claim as our invention is:

1. Apparatus for forming a pattern of articles from a plurality of rows of articles being conveyed in a downstream direction on a conveyor to the apparatus, the conveyor of the type having a run that is movable in a downstream direction, the conveyor run having opposite first and second sides separated by a width of the conveyor run and an upper surface extending between the sides for supporting articles on the conveyor, the apparatus comprising:

a fence being selectively movable between a first position stationary along the conveyor path during pattern forming and a second position away from the conveyor path, the fence extending at least partially across the upper surface of the conveyor run and configured to obstruct movement of a row of articles moving downstream on the conveyor during pattern forming;

the fence not obstructing movement of articles moving downstream on the conveyor when the fence is in the second position;

a pattern forming device extending along a portion of the conveyor run upstream of the fence;

the pattern forming device comprising first and second fingers on opposite sides of the conveyer run, the first finger adjacent the first side and the second finger adjacent the second side, the first and second fingers spaced across from each along an axis generally perpendicular to the first direction and defining an axial gap therebetween;

the pairs of first and second fingers being in fixed positions along the conveyor path upstream from the first position of the fence;

each finger movable along said axis between extended and retracted positions, each finger disposed over the conveyor belt when in the extended position, the fingers moving towards one another when moving together from their retracted positions to their extended positions and moving away from each other when moving together from their extended positions to their retracted positions;

a controller operatively connected to the first and second fingers, the control unit comprising a first drive connected to the first finger and a second drive connected to the second finger, each of the first and second drives operable to selectively move the finger connected to the drive between the extended and retracted positions, the control unit configured to place the first and second fingers in their retracted positions prior to the articles reaching the fence;

the first and second fingers being spaced from the fence such that a row of articles impacting the fence substantially simultaneously move into registration with the gap defined between the first and second fingers;

the controller comprising a signal generator configured to generate a control signal when a row of articles moving downstream on the upper surface of the belt run moves into registration with the gap defined between the first and second fingers when the first and second fingers are in the retracted position; and the controller responsive to the control signal to move each of the first and second fingers from their retracted positions to their extended positions, the row of articles closely spaced between the first and second fingers when the first and second fingers are in their extended positions while forming the article pattern whereby the fingers resist displacement of the articles within the row of articles.

2. Apparatus for forming a pattern of articles from a plurality of rows of articles being conveyed in a downstream direction on a conveyor to the apparatus, the conveyor of the type having a run that is movable in a downstream direction, the conveyor run having opposite first and second sides separated by a width of the conveyor run and an upper surface extending between the sides for supporting articles on the conveyor, the apparatus comprising:

a fence extending at least partially across the upper surface of the conveyor run and configured to obstruct movement of a row of articles moving downstream on the conveyor, the fence in the first position when the apparatus is forming a pattern of articles;

a pattern forming device extending along a portion of the conveyor run upstream of the fence;

the pattern forming device comprising first and second fingers on opposite sides of the conveyor run, the first finger adjacent the first side and the second finger adjacent the second side, the first and second fingers spaced across from each along an axis generally perpendicular to the first direction and defining an axial gap therebetween;

each finger movable along said axis between extended and retracted positions, each finger disposed over the conveyor belt when in the extended position, the fingers moving towards one another when moving together from their retracted positions to their extended positions and moving away from each other when moving together from their extended positions to their retracted positions;

a controller operatively connected to the first and second fingers, the control unit comprising a first drive connected to the first finger and a second drive connected to the second finger, each of the first and second drives operable to selectively move the finger connected to the drive between the extended and retracted positions, the control unit configured to place the first and second fingers in their retracted positions prior to the articles reaching the fence;

the controller comprising a signal generator configured to generate a control signal when a row of articles moving downstream on the upper surface of the belt run moves into registration with the gap defined between the first and second fingers when the first and second fingers are in the retracted position;

the controller responsive to the control signal to move each of the first and second fingers from their retracted positions to their extended positions;

the conveyor being of the type having the upper surface of the conveyor moving downstream at a conveyor speed when the conveyor is operating;

each finger being movable in the downstream direction between an upstream position and a downstream position;

the controller comprising an additional drive connected to the first and second fingers, the additional drive operable to move the first and second fingers between the upstream position of the fingers to the downstream position of the fingers; and the controller being configured to place the first and second fingers in their upstream positions prior to the articles reaching the apparatus, the controller responsive to the control signal to initiate downstream movement of the first and second fingers at substantially the conveyor speed whereby the first and second fingers move downstream with the row of articles as the fingers move from their first positions to their second positions.

3. The pattern-forming apparatus of claim 2 comprising multiple pairs of first and second fingers, the pairs of first and second fingers spaced apart along the conveyor path.

4. The pattern-forming apparatus of claim 1 wherein the fence is movable to only one first position along the conveyor path.

5. The pattern-forming apparatus of claim 2 wherein the fence is selectively positionable along the conveyor belt between spaced-apart upstream and downstream positions.

6. The pattern-forming apparatus of claim 5 comprising a pair of side rails extending along opposite sides of the conveyor belt between the upstream and downstream positions of the fence, the side rails movable towards and away from each other.

7. The pattern-forming apparatus of claim 5 wherein the fence is a first fence and the pattern-apparatus comprises a sweep disposed over the conveyor belt and movable along a length of the conveyor belt, the sweep comprising the first fence and a second fence upstream from the first fence, the second fence movable between raised and lowered positions with respect to the conveyor belt.

8. The pattern-forming apparatus of claim 2 in which each article is of the type having an outer surface and each finger has a surface shaped to closely conform to the outer surface of an article.

9. The pattern-forming apparatus of claim 8 wherein each finger has a downstream side facing the downstream direction and the finger surface of the finger is disposed on the downstream side of the finger.

10. The pattern forming apparatus of claim 8 wherein each finger has an upstream side facing the upstream direction and the finger surface of the finger is disposed on the upstream side of the finger.

11. The pattern-forming apparatus of claim 2 in which each article is of the type having an outer surface, and wherein each finger has an upstream side facing upstream direction and a downstream side facing the downstream direction, and each finger has a first surface disposed on the upstream side of the finger and a second surface disposed on the downstream side of the finger, the first and second surfaces each shaped to closely conform to the outer surface of an article.

12. The pattern-forming apparatus of claim 11 in which the first and second surfaces of each finger are concave surfaces.

13. The pattern-forming apparatus of claim 1 wherein the first and second fingers is a first pair of first and second fingers, the apparatus further comprising one or more additional pairs of first and second fingers spaced apart in fixed positions along the conveyor path upstream from the first pair of first and second fingers, the controller comprising additional first and second drives associated with each additional first and second pair of fingers to move the each additional first and second pair of fingers between extended and retracted positions.

14. The pattern-forming apparatus of claim 13 wherein the one or more additional pairs of first and second fingers are successively spaced upstream along the conveyer belt away from the first pair of first and second fingers;

the signal generator generates a control signal during pattern forming when a row of articles moving downstream moves into registration with the most downstream pair of retracted first and second fingers; and the controller is responsive to the control signal to move the pair of first and second fingers associated with the control signal from retracted positions to extended positions.

15. The pattern-forming apparatus of claim 14 wherein the pattern of articles to be formed has a row spacing, and the additional pair of first and second fingers adjacent the first pair of first and second fingers is spaced along the conveyor belt twice the row spacing away from the first pair of first and second fingers.

16. The pattern-forming apparatus of claim 15 wherein the one or more additional pairs of first and second fingers comprise two or more pairs, with adjacent pairs of the additional pairs being spaced apart from each other along the conveyor belt by twice the row spacing.

17. The pattern-forming apparatus of claim 16 wherein during pattern forming the signal generator generates a control signal indicating a row of articles is in registration with the pair of first and second fingers substantially simultaneously with the row of articles impacting the fence or an adjacent downstream row of articles.

18. The pattern-forming apparatus of claim 1 wherein during pattern forming a row of articles moving into registration with the retracted first pair of first and second fingers substantially simultaneously impacts the fence; and wherein each additional upstream row of articles moving into registration with the furthest downstream retracted pair of first and second pair of fingers substantially simultaneously impacts with the adjacent downstream row of articles.

19. The pattern-forming apparatus of claim 1 wherein during pattern forming a row of articles moving into registration with the pair of first and second fingers substantially simultaneously impacts the fence.

20. The pattern-forming apparatus of claim 1 wherein each first and second finger comprises a first surface facing the first surface of the other finger and a second surface extending from the first surface away from the other finger.

21. The pattern-forming apparatus of claim 20 wherein the first and second fingers when in extended positions are configured to closely receive a row of N articles between the first surfaces of the fingers and closely receive a row of N+1 articles between the second surfaces of the fingers.

\* \* \* \* \*